United States Patent
Santorius et al.

(10) Patent No.: US 6,629,806 B1
(45) Date of Patent: Oct. 7, 2003

(54) PROCESS FOR METAL-REMOVING MACHINING

(75) Inventors: Rolf Santorius, Uhingen-Nassachmühle (DE); Paul Dieter Scharpf, Schlat (DE); Wolf-Dietrich Voss, Boll (DE); Matthias Kohlhase, Schramberg-Sulgen (DE); Herbert Kiefer, Steisslingen (DE); Leo Schreiber, Schwäbisch-Gmünd (DE)

(73) Assignee: Boehringer Werkzeugmaschinen GmbH, Goppingen (DE)

( * ) Notice: Subject to any disclaimer, the term of this patent is extended or adjusted under 35 U.S.C. 154(b) by 0 days.

(21) Appl. No.: 09/202,863

(22) PCT Filed: Jul. 1, 1997

(86) PCT No.: PCT/EP97/03418
§ 371 (c)(1),
(2), (4) Date: Dec. 22, 1998

(87) PCT Pub. No.: WO98/00261
PCT Pub. Date: Jan. 8, 1998

(30) Foreign Application Priority Data

Jul. 2, 1996 (DE) .......................................... 196 26 608

(51) Int. Cl.[7] .................................................. B23C 3/06
(52) U.S. Cl. ........................ 409/132; 409/199; 409/200
(58) Field of Search ................................. 409/131, 132, 409/200, 203, 204, 201, 206, 190, 888.08; 82/106; 29/27 R, 6.01

(56) References Cited

U.S. PATENT DOCUMENTS

| | | | | |
|---|---|---|---|---|
| 4,433,948 A | * | 2/1984 | Kodama | 407/42 |
| 4,564,323 A | * | 1/1986 | Berbalk | 409/200 |
| 5,505,751 A | * | 4/1996 | Mehrotra et al. | 407/119 X |
| 5,643,658 A | * | 7/1997 | Uchino et al. | 409/131 UX |
| 5,765,270 A | * | 6/1998 | Schrod | 29/27 R |
| 5,803,683 A | * | 9/1998 | Turchan | 409/277 |
| 6,322,300 B1 | * | 11/2001 | Santorius et al. | 409/199 |
| 6,374,472 B1 | * | 4/2002 | Ramold et al. | 29/27 R |

FOREIGN PATENT DOCUMENTS

| | | | | |
|---|---|---|---|---|
| DE | 3502192 | * | 7/1986 | 409/217 |
| EP | 720883 | * | 7/1996 | 409/199 |
| JP | 0001101 | * | 1/1984 | 409/162 |

OTHER PUBLICATIONS

Heller Crankshaft Rotary Milling Machines RFK (brochure) published Aug. 1954.

* cited by examiner

Primary Examiner—William Briggs
(74) Attorney, Agent, or Firm—Norris McLaughlin & Marcus

(57) ABSTRACT

A process for the metal-removing machining of a workpiece, where a disc-shaped external milling cutter is provided having cutting edges positioned on its outer circumference, the workpiece is rotated, and peripheral surfaces of the workpiece are machined with the milling cutter, by rotating the milling cutter to have a cutting speed of at least 180 m/min when roughing and at least 200 m/min when finishing, and a chip thickness of between 0.05–0.5 mm.

14 Claims, 24 Drawing Sheets

PROCESS FOR METAL-REMOVING MACHINING

BACKGROUND OF THE INVENTION

The invention relates to the metal-removing machining of workpieces, in particular crankshafts, in particular of crankshafts for engines for passenger vehicles.

For various reasons, crankshafts are difficult to machine, since firstly they have eccentrically positioned rotationally-symmetrical surfaces, namely the peripheral surfaces of the big-end journals, and moreover when chucked only at their ends form a workpiece which is relatively unstable in the transverse direction and the longitudinal direction.

Since in particular crankshafts for passenger vehicles are produced in very large numbers and are subject to considerable pressure on prices, a focal point with regard to keeping production costs as low as possible is a machining time which is as short as possible and has a small number of operating steps while maintaining sufficient machining quality and dimensional accuracy.

To date, passenger vehicle crankshafts, which currently still predominantly consist of grey cast iron, e.g. GGG60 or 70, have been machined in the unhardened state by turning, internal milling, rotary turn broaching or similar machining processes on the necessary surfaces, that is to say the peripheral surfaces of the bearing locations and on the end faces of the webs, cutting speeds of 100 to 160 m/min being customary for example for milling. In this case, the cutting edges of the milling tools, which are generally formed as internal circular-milling cutters, have a negative tool geometry. The milling has been followed by hardening and then rough-grinding and precision-grinding The specific machining processes which are currently customary, i.e. turning, rotary turn broaching and internal milling and internal milling (that is to say milling with an internally toothed, annular milling cutter, in the interior of which the workpiece is arranged) have specific advantages and disadvantages:

Internal milling has preferably been used to machine the big-end journals of the crankshaft and the adjoining web surfaces. The advantage consists, on the one hand, in that in the process the workpiece does not move or is rotated at only a low rotational speed and the internal milling cutter is moved around the journal to be machined. The cutting speed is thus produced solely or primarily by the tool, so that a plurality of tools can operate simultaneously and independently on the same workpiece.

This process is suitable above all for high metal-removal rates per unit time, the disadvantages of such rates being the corollary effects of high cutting forces and high tool and chip temperatures.

Internal milling is less suitable in particular for unstable workpieces, such as for example split-pin crankshafts (in which two crankpin journals, which partially overlap one another in the radial direction, are situated only a very small distance apart by comparison with the width of the journal; as required for V-engines).

Internal milling is to be preferred to rotary turn broaching for cost reasons, since it requires a shorter machining time per journal; however, the roundness deviations in internal milling are greater by a multiple than in rotary turn broaching.

The advantages of rotary turn broaching are thus primarily the good dimensional accuracy, in particular the low roundness deviations.

However, in rotary turn broaching the workpiece, e.g. the crankshaft, rotates, in contrast to internal milling, specifically at a considerably higher speed than the tool itself, which may even, under certain circumstances, not execute a complete revolution but rather only a pivoting motion, in order to bring into action on the workpiece the cutting edges which are arranged one behind the other on the external circumference of the tool.

The cutting speed is thus primarily produced by the rotation of the workpiece, resulting in the disadvantage that where specific cutting speeds are to be observed it is not possible for a plurality of tool units to work independently of one another on the workpiece, but rather only on mutually corresponding parts of the workpiece, that is to say, for example, on a plurality of centre bearings or on the two big-end journals, arranged in an identical angular position, of a crankshaft for a 4-cylinder in-line engine.

For this reason, rotary turn broaching machining has been adopted primarily for machining the centre bearings.

SUMMARY OF THE INVENTION

The object in accordance with the present invention is to provide a metal-removing machining process in particular for crankshafts, which allow [sic] a short machining time but nevertheless a high machining quality and thus low production costs for the crankshaft.

The two competing parameters here are chip thickness and cutting speed:

For reasons of keeping the introduction of cutting forces into the workpiece as low as possible, in order to minimize the deflection thereof, low chip thicknesses are sought. However, this increases the machining time and can only be compensated for by increasing the cutting speed. In addition, the cutting speed frequently affects the service life, i.e. the overall machining capacity of the cutting means, so that additional boundary conditions apply in this respect too.

This object is achieved by means of the features of Claim 1. Advantageous embodiments emerge from the subclaims.

The shorter machining time is achieved in that the cutting speeds are drastically increased in particular for milling, specifically to at least 180 m/min, in particular to 250 to 600 in/min, in particular to 450 to 600 m/min, for roughing and to at least 200 m/min, in particular to 300 to 800 m/min, in particular to 650 to 850 in/min, for finishing, and with certain cutting materials, such as for example cemented oxides, CBN, PCD (=polycrystalline diamond), cermets (hard metal-ceramic mixture), including coated cermets, e.g. TiAlN-coated cermets, to over 1000 m/min. These cutting speeds are achieved, for example in the case of a disc-like milling cutter with a diameter of 800 mm, in that the tool rotates at 50–2000, in particular 200–400, in particular 200–250 revolutions per minute and at the same time the workpiece rotates at 0–60, in particular 15–20 revolutions/minute in the case of a crankpin journal having a diameter of, for example, 50 mm. Particularly when milling the crankshaft, in particular by means of a large disc-like external milling cutter, this has the effect of reducing the introduction of force into the workpiece per cutting-edge action, owing to the considerably higher frequency of interruption to the cut during milling.

The above is assisted by the fact that a positive tool geometry is employed instead of the previous negative tool geometry and sometimes new materials are employed for the cutting means. In this process, the cutting edges on the disc-like milling cutter are positioned either on the outer circumference of the milling cutter and/or on the end face in the corner region between end face and circumferential surface of the milling cutter, thus permitting the machining not only of the peripheral surfaces of the crankshaft but also of the various, in particular end-side, web surfaces. Since, however, the volume of metal to be removed during the end-face machining of a web is usually considerably greater than when machining the peripheral surfaces of a journal of a crankshaft, it is preferable for a separate milling cutter to be used for the machining of the webs and also a separate milling cutter for the machining of the journals.

In addition, it is generally necessary to make radial recesses, the so-called undercuts, at the transition between the journal surface and the web surface.

A number of different cutting distributions are conceivable in order nevertheless to be able to machine more than just a specific axial length of a bearing using a tool: either a separate milling cutter is provided in each case for the left-hand end region of the journal peripheral surface and for the right-hand end region, in the case of which cutter, following the cutting-edge surfaces for the peripheral surface of the journal, protruding cutting-edge parts is [sic] present for producing the undercut.

The cutting-edge area for machining the peripheral surface in this case has to be sufficiently large in the axial direction for these cutting areas of the two milling cutters for the left-hand and right-hand halves of a journal to overlap in the normal situation, in order thus to permit axial compensation for bearings with different axial lengths. At the overlapping end, the cutting edges for the peripheral surface shallow out gently by means of a slight drop-off or a considerable rounding, in order not to produce an encircling edge in the overlap region.

The other possibility consists in making the undercuts with a special milling cutter, while another milling cutter only has cutting edges for machining the journals, i.e. does not have any protruding cutting-edge areas for an undercut. A milling cutter of this kind which is purely for cutting journals may be of relatively narrow design, that is to say narrower than the shortest expected axial extent of a bearing journal. In order to machine the entire axial length of the bearing journal, this milling unit is additionally moved slowly in the longitudinal direction, that is to say the Z-direction, so that a helical, strip-like path is machined along the peripheral surface of the journal.

This results, by comparison with the known machining of axially adjacent, slightly overlapping annular regions, in there being no annular step (which can never be completely avoided) between the individual annular regions.

Owing to the high cutting speeds, it is also possible to keep the feed and chip thickness at low levels, and thus to achieve high machining quality while nevertheless retaining a low machining time.

High-speed metal-removing machining, in particular high-speed milling, therefore combines a number of advantages:

The workpiece is only chucked centrically, that is to say on the longitudinal axis of the big-end journal positions, and is only driven slowly. Imbalances of the workpiece itself therefore have scarcely any effect on the machining process and the cutting speed is primarily achieved by the rotation of the, for example disc-like, external milling cutter. It is thus possible in principle to have a plurality of such tool units working independently of one another on the workpiece. The big-end journals too are machined with the workpiece chucked centrically, the external milling cutter only having to be displaceable along the X-axis. Owing to the relatively slow rotation of the workpiece, the milling tool can constantly follow the crankpin journal, during the rotation of the latter, by means of this X-displacement.

It is also possible to machine tangential, planar surfaces on the workpiece and/or to machine non-circular external surfaces, and even to mill cavities in the workpiece surface, as long as the radius of curvature thereof is greater than the radius of the external milling cutter.

Tangential milling off on the workpiece also makes it possible, for example, to carry out a balancing operation directly during clamping of the work, in that in the determined angular position mass is removed from the workpiece until the imbalance is eliminated.

Despite the bevelling of the surface, which is typical of the milling of peripheral surfaces, it is possible by means of high-speed external milling cutting to achieve roundness deviations which are as low as those which can be achieved by means of rotary turn broaching; these are in no way attainable by means of internal milling. Nevertheless, the machining time for high-speed milling is lower by a factor of about 3–5 than the machining time for rotary turn broaching and is lower by a factor of approximately 2 than the machining time for internal milling.

Owing to the extremely low chip thickness (what is meant here is the average or the maximum chip thickness, since in the case of, for example, the machining of the peripheral surfaces by means of external circular milling the thickness of the chip changes as the operation progresses) and a relatively short chip length, on the one hand the cutting forces introduced into the workpiece are low, and on the other hand the major part of the process heat is introduced into the chip but not into the workpiece and tool, so that, for dynamic and thermal reasons, very good dimensional accuracy is achieved on the workpiece.

Owing to the cutting parameters and cutting materials, the workpiece is generally machined dry, that is to say without the use of a cooling lubricant, which considerably simplifies disposal of the chips.

If, in addition, the diameter of the milling cutter is selected to be larger than the necessary penetration depth for the crankshaft to be produced at the big-end journal remote from the tool, that is to say for a crankshaft throw of, for example, 120 mm and a penetration depth of about 200–250 mm, the diameter of the external milling cutter is selected to be at least 700, preferably 800–1000 mm, only relatively low rotational speeds of the tool of 50–300 revolutions/minute are necessary to achieve the desired cutting speed. Owing to the large diameter of the milling cutter, the time between two successive cutting interventions by one and the same cutting edge increases, consequently also increasing the time available for cooling the cutting edge and the adjoining tool body, thus reducing the thermal loading on the tool and consequently increasing its service life.

Aligning the individual cutting edges on a precise circular path with respect to the tool body is also facilitated as the diameter of the milling cutter increases.

The additional use of a positive tool geometry instead of the negative tool geometry which was previously used in milling and which nevertheless, primarily in connection with the low average or maximum chip thicknesses, leads to a sufficient tool life of the cutting means, in turn results in a reduction in the cutting forces and consequently also in a reduction in the driving powers required for the tool, which powers, for the size ratios indicated, is [sic] only about half to one third of the power required for internal milling or rotary turn broaching. In addition to the lower energy costs, this also minimizes the waste heat problems of the drives, which always have a negative effect on the overall machine and the machining result.

The high-speed milling according to the invention may in this case be carried out, in particular, not only on the unhardened workpiece but also on the hardened (e.g. Rockwell hardness $H_{RC}$ of 60 to 62, in particular fully hardened) workpiece. In this case, the cutting material preferably used is cermet or polycrystalline boron nitride (PCB), and in the case of the latter in particular cubic boron nitride (CBN). In this case, it is preferable firstly to sinter a carbide cutting tool tip which, however, has cavities in the cutting-edge area, e.g. in the tool face open towards the cutting edge. CBN powder is placed in these cavities in the base body and is then sintered.

It is not only the noses of throw-away cutting tool tips which can be reinforced in this manner, but also an entire cutting edge can be reinforced by arranging a plurality of CBN pellets next to one another along a cutting edge, or else by providing a bar-shaped CBN insert. It is consequently also possible to machine unhardened steel or cast iron, even by milling.

These cutting materials can also be used without cooling lubricant, that is to say dry, thus saving on disposal costs and environmental problems.

It is thus possible even as early as during the metal-removing machining to eliminate the distortion of the workpiece which due to the hardening process occurs in conventional production (metal-removing machining prior to hardening). Since, when using high-speed milling and in particular when using high-speed milling on the hardened workpiece, it is possible to achieve surface qualities which are acceptable as the final state of the workpiece, it is consequently possible to dispense with at least the rough-grinding operation altogether.

When machining the journal and web surfaces on crankshafts which consist of cast iron or steel and are machining [sic] in the unhardened state by means of an external circular-milling cutter, in particular by means of a disc-like milling cutter with cutting edges on the circumferential region, it has proven particularly advantageous to observe the following parameters:

Cutting speed during the roughing machining: at least 180, preferably 250–600 m/min, Cutting speed during the finishing machining: at least 200, preferably 300–800 m/min, Chip thickness: 0.05–0.5 mm in particular 0.1–0.3 mm.

The tool used here is generally a disc-like tool body driven in rotation and having inserted throw-away cutting tool tips. In this case, the configuration of the cutting tool tips differs depending on their intended purpose (machining of the end faces on the webs, machining of the peripheral surfaces on the journals of the main bearing point and big-end journal points, production of the undercuts at the transition between peripheral surfaces and end faces) and they are also positioned differently with respect to the tool carrier or to the workpiece:

|  | Web-cutting tip | | Undercut-cutting tip | | Journal-cutting tip (face-cutting tip) | |
|---|---|---|---|---|---|---|
|  | Basic material | | | | | |
|  | K20–K25 | | K15 | | K10–K15 | |
|  | Coating | | | | | |
|  | TiCN + Al$_2$O$_3$ + TiN or TiN + TiCN + Al$_2$O$_3$ or TiN + Al$_2$O$_3$ + TiN | | TiN | | TiCN + Al$_2$O$_3$ + TiN or TiN + TiCN + Al$_2$O$_2$ + TiN or TiN + Al$_2$O$_3$ + TiN | |
|  | from/to | esp. | from/to | esp. | from/to | esp. |
| Total thickness of the coating | 3–15 μm | 10–12 μm | 2–8 μm | 3–5 μm | 2–8 μm | 3–5 μm |
| γ$_p$ | +1° ... +8° | +5° | +4° | +4° | +2° | +2° |
| γ$_f$ | −4° ... +4° | −1° | +1° | +1° | +2° | +2° |
| γ$_n$ | +5° ... +14° | +9° | +9° | +9° | +9° | +9° |
| λ$_s$ | +2° ... +7 | +5° | +5° | +5° | +3° | +3° |
| κ | about +2° | 5° | | 4° | | — |
| Cutting edge rounding (CRE) | 0.01–0.05 mm | about 0.02 mm | about 0.02 mm | about 0.02 mm | about 0.02 mm | about 0.02 mm |
| Nose radius R | 1.2–2.0 mm | 1.6 mm | 1.6 mm | 1.6 mm | — | — |
| Length min. 10 mm | min. 10 mm | 15.9 mm | 15.9 mm | 15.9 mm | 12.7 mm | 12.7 mm |
| Height min. 10 mm | min. 10 mm | 12.7 mm | 12.7 mm | 12.7 mm | 12.7 mm | 12.7 mm |
| Thickness min. 3 mm | min. 3 mm | 6.35 mm | 5.55 mm | 5.55 mm | 4.7 mm | 4.7 mm |
| Data with regard to the tool body: | | | | | | |
| Width of cut | 23 mm | | — | | 13 mm (split) to 22 mm (complete) | |
| Nominal diameter | e.g. 800 mm | | e.g. 800 mm | | e.g. 800 mm | |
| Pitch angle from cutting edge to cutting edge | 3.6° | | 5.5°–7.5° | | 5.5°–7.5° | |
| Pitch spacing from cutting edge to cutting edge | 25 mm | | 35–50 mm | | 35–50 mm | |
| Number of cutting tips | e.g. 200 | | e.g. 120 (split) to 200 (complete) | | e.g. 120 (split) to 200 (complete) | |

Data on the basic material relates to the known ISO application groups, in which: K10: consists of 94.2% tungsten carbide (TC), 5.5% cobalt (Co) and 0.3% ... (Ta/C) K20: consists of 93.2% TC, 6%, Co and 0.6%; Ta/C and 0.2% titanium carbide (TiC)

The flexural strength is 1900 N/m$^2$ for K10 and 2000 N/m$^2$ for K20.

In the coatings specified, the individual compounds are applied in layers one after the other in the sequence specified from the inside outwards.

BRIEF DESCRIPTION OF THE DRAWINGS

The geometrical parameters of the tool, in particular of the throw-away cutting tool tips for the external circular-milling cutter are explained in more detail below with reference to the figures, in which.

The corresponding designations are stipulated in the deutschen Industrienorm [German Industrial Standard] DIN 6581.

DESCRIPTION OF THE PREFERRED EMBODIMENT

Figure 1:
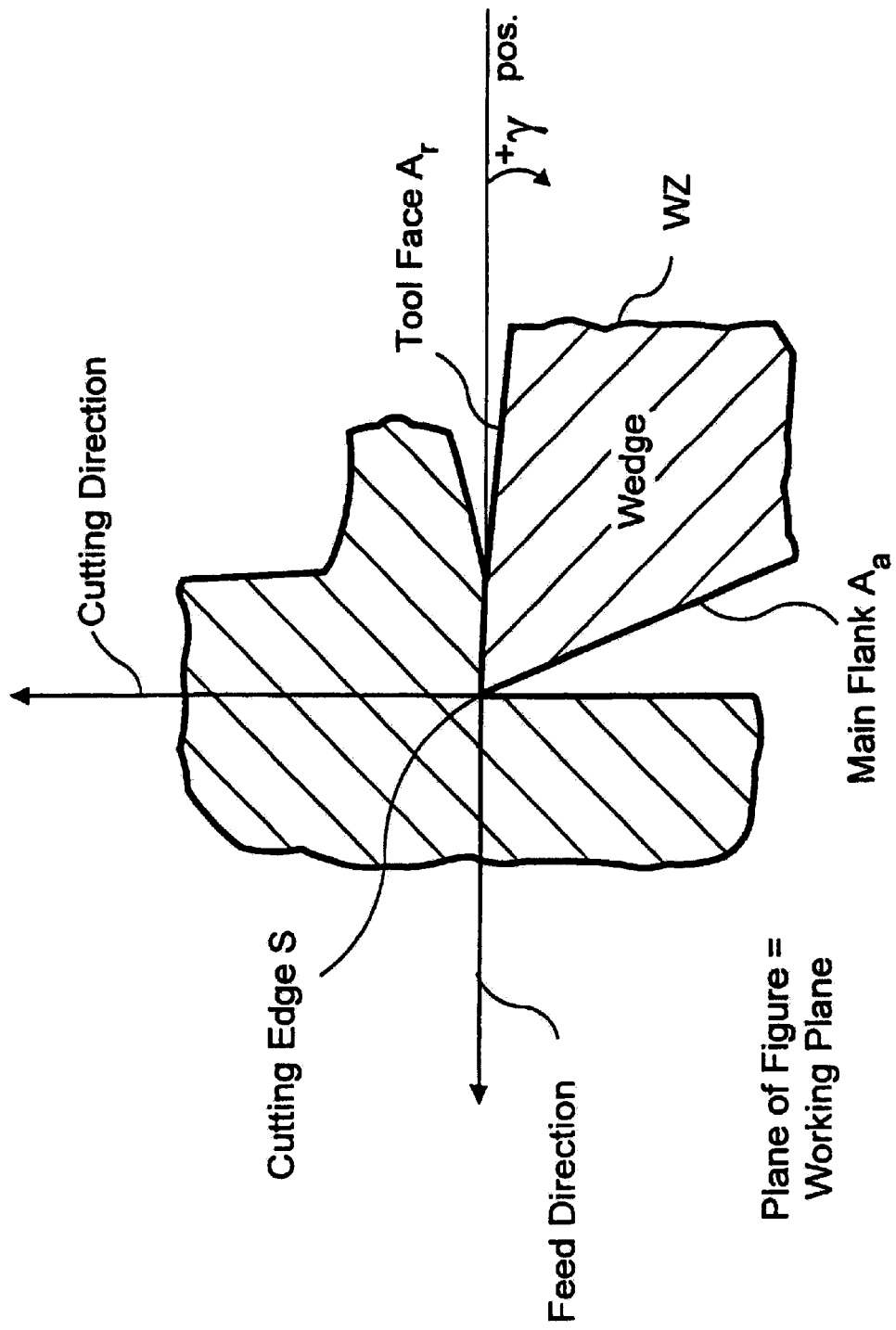
FIG. 1 shows a schematic representation of the wedge of the tool.
Figure 2:
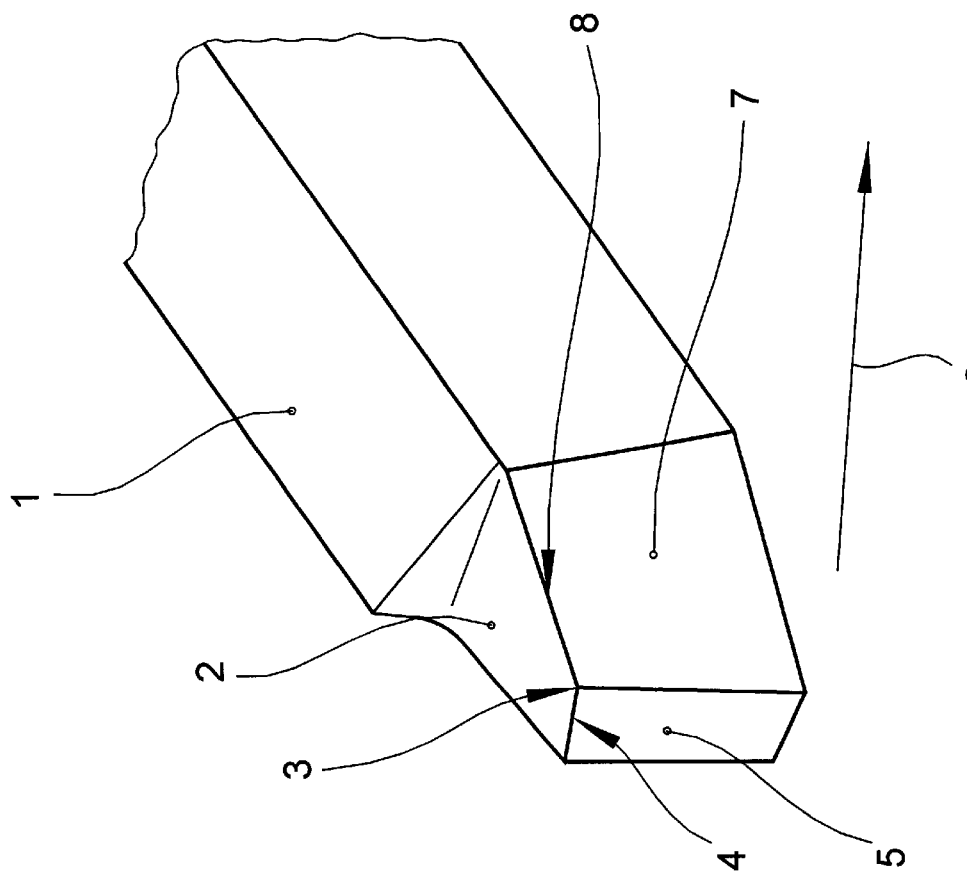
FIG. 2 shows the cutting edges and surfaces on the cutting part of a turning tool.

FIG. 1 shows a section through a metal-removing tool WZ, for example the turning tool depicted in perspective in FIG. 2, most designations and angles applying both to turning and to milling. Here, the cutting edge, for example the main cutting edge S, is formed by the edge formed by the tool face $A_\gamma$ and the main flank $A_\alpha$, and the secondary cutting edge S' (see FIG. 2) is formed by the tool face $A_\gamma$ and the secondary flank $A'_\alpha$ running at an angle to the main flank $A_\alpha$. The cutting edge S, which in FIG. 1 is shown as a sharp edge, is in practice never completely sharp, but rather has to have a certain degree of rounding, the cutting edge rounding (CER), in order to prevent the cutting edge chipping.

Figure 3:
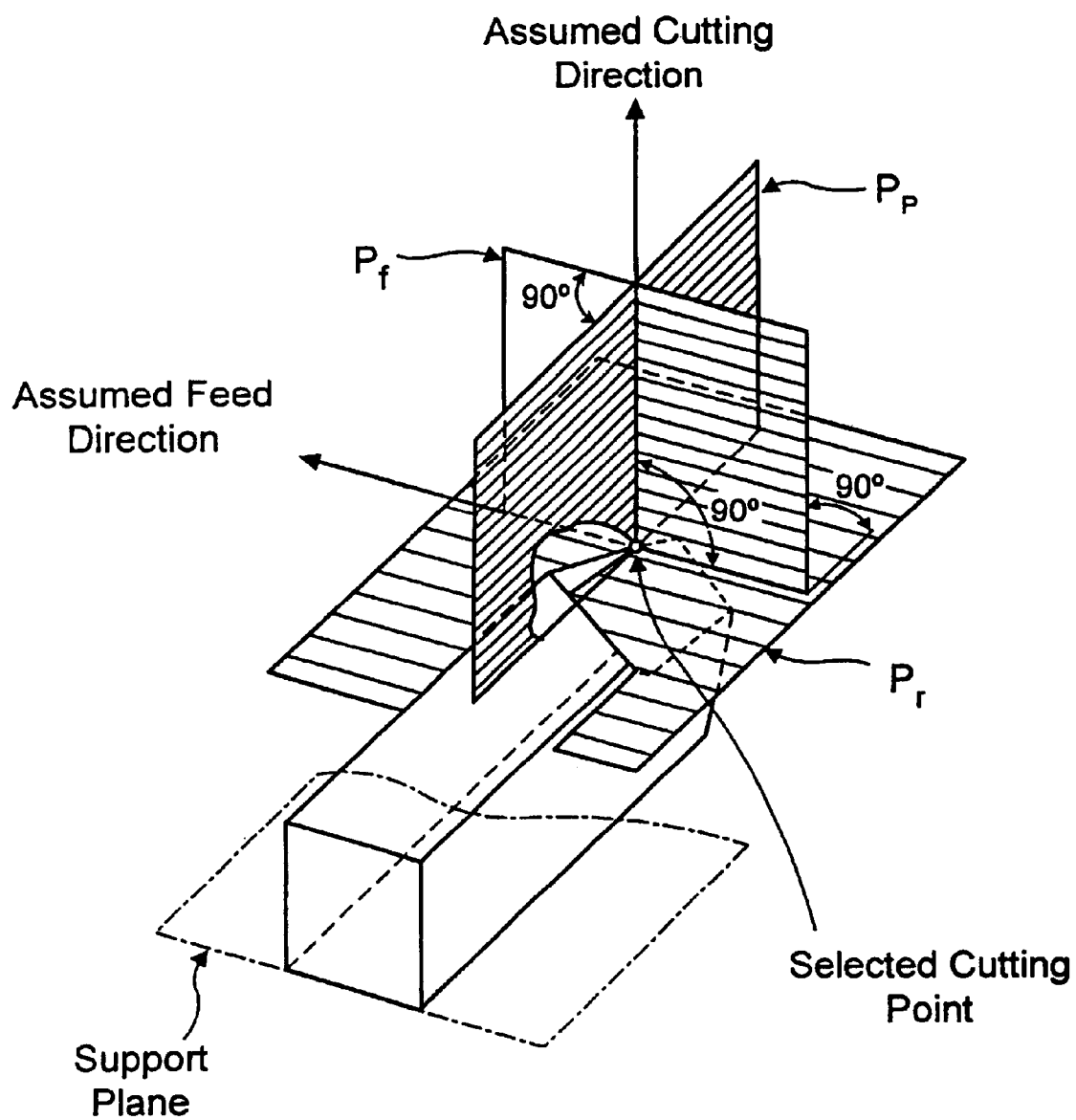
FIGS. 3 and 4 show defined planes of the tool reference system.
Figure 4:
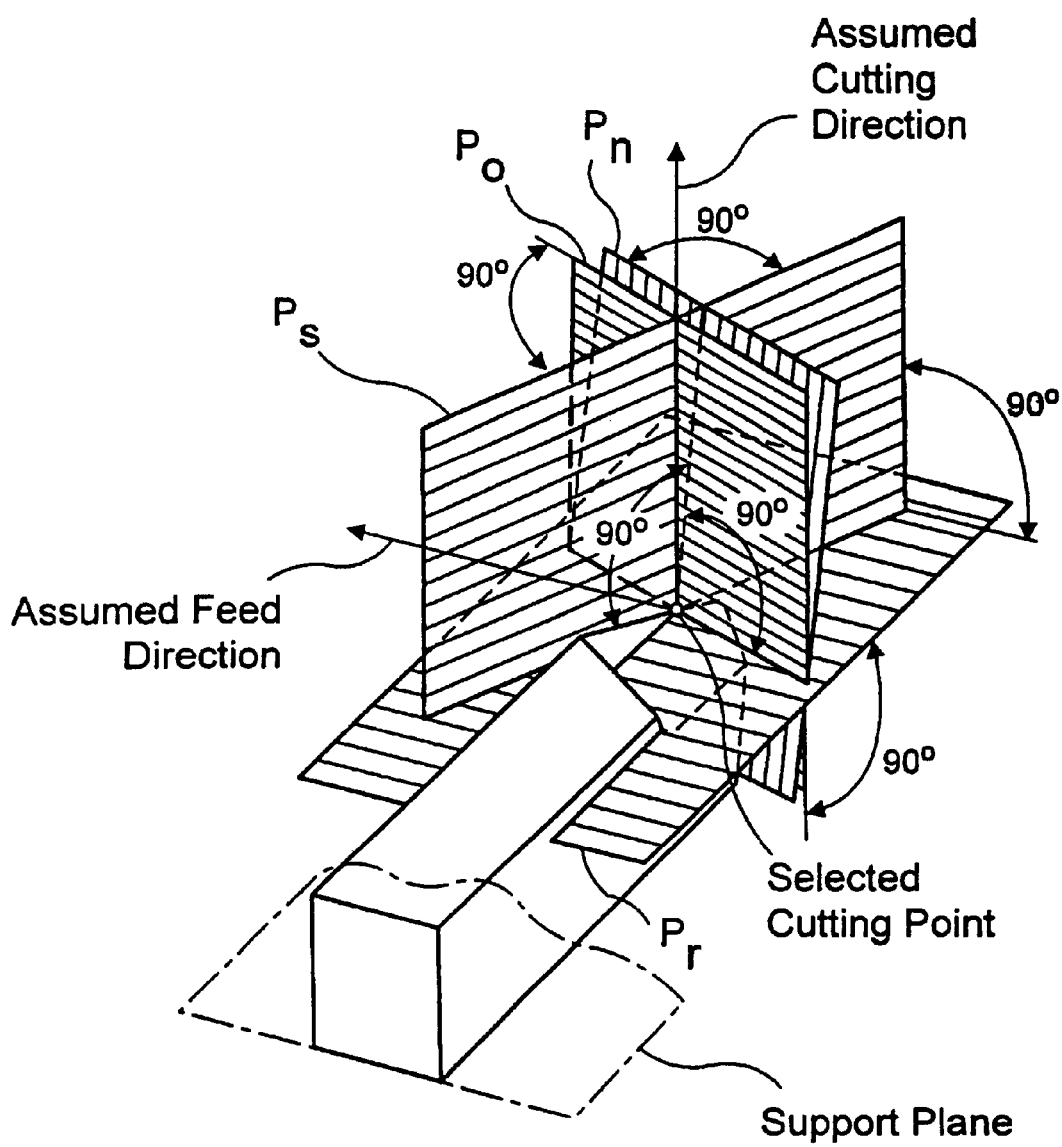

Various directions and planes with respect to the tool are defined in FIGS. 3 and 4.

In these Figures, the tool reference plane $P_r$ is a plane through the selected cutting-edge point, specifically perpendicular to the assumed cutting direction. The tool reference plane $P_r$ is in this case as far as possible selected such that it lies parallel or perpendicular to an axis of the tool. It has to be stipulated individually for each type of tool. In the case of turning tools, the tool reference plane $P_r$ is a plane parallel to the base of the shank for conventional turning tools, while in the case of milling tools it is a plane which contains the axis of the milling tool.

The assumed working plane $P_f$ is a plane through the selected cutting-edge point, perpendicular to the tool reference plane $P_r$ and parallel to the assumed feed direction.

The tool rear plane $P_p$ is a plane through the selected cutting-edge point, perpendicular to the tool reference plane $P_r$ and perpendicular to the assumed working plane $P_f$. $P_r$, $P_p$ and $P_f$ thus form a coordinate system through the assumed cutting point.

The tool cutting-edge plane $P_s$ (see FIG. 4) is a plane through the cutting-edge point, tangential with respect to the cutting edge S and perpendicular to the tool reference plane $P_r$. If the tool cutting edge S is at right angles to the feed direction, tool cutting-edge plane $P_s$ and tool rear plane $P_p$ coincide.

The tool orthogonal plane $P_o$ is a plane through the cutting-edge point, perpendicular to the tool reference plane $P_r$ and perpendicular to the tool cutting-edge plane $P_s$. Therefore, if the tool cutting-edge S is at right angles to the feed direction, tool orthogonal plane $P_o$ and assumed working plane $P_f$ coincide.

Figure 5:
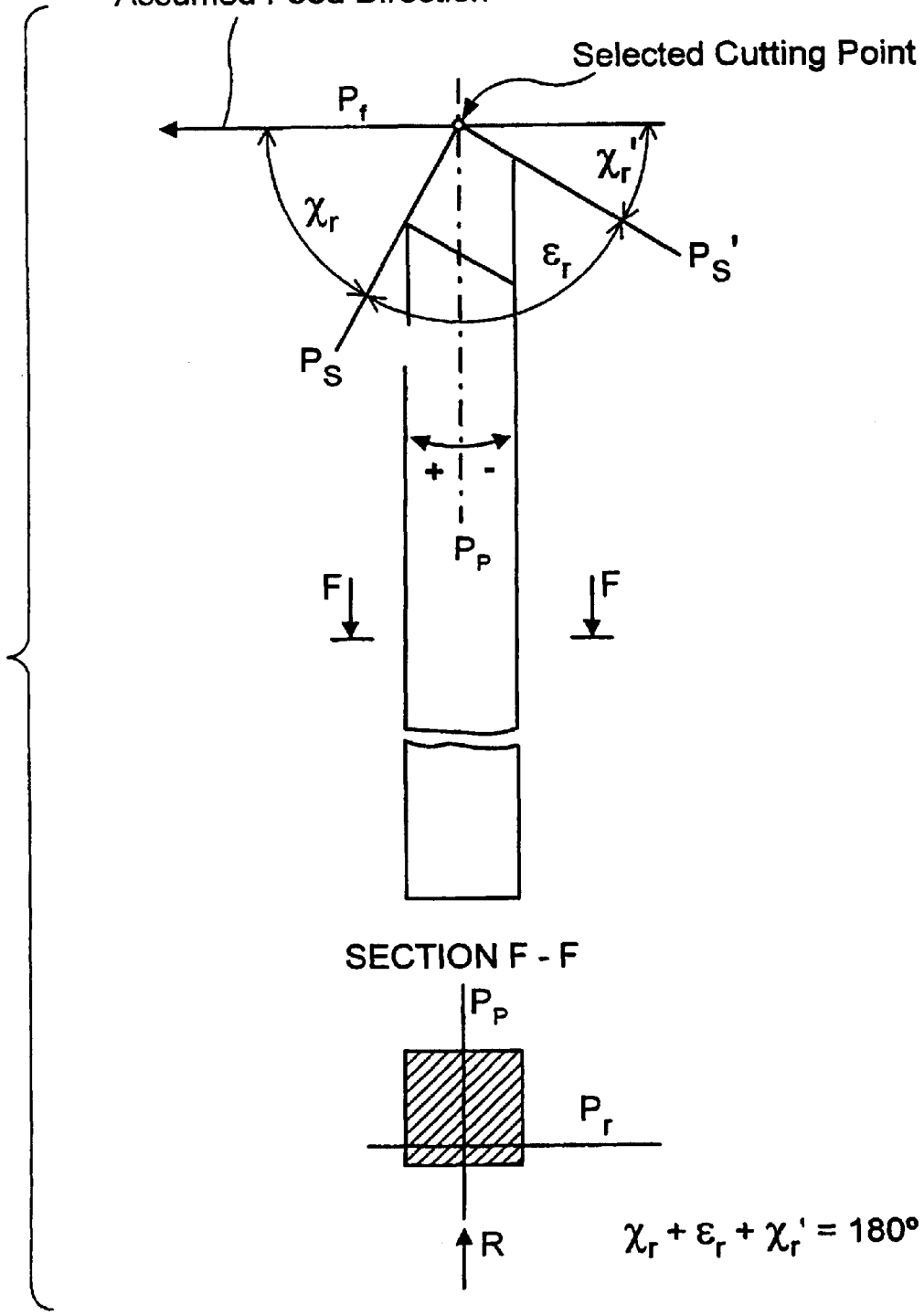
FIGS. 5 and 6 show the angular position of the cutting edge in the tool reference system using the example of a turning tool for plain turning (FIG. 5) and face turning (FIG. 6).
Figure 6:
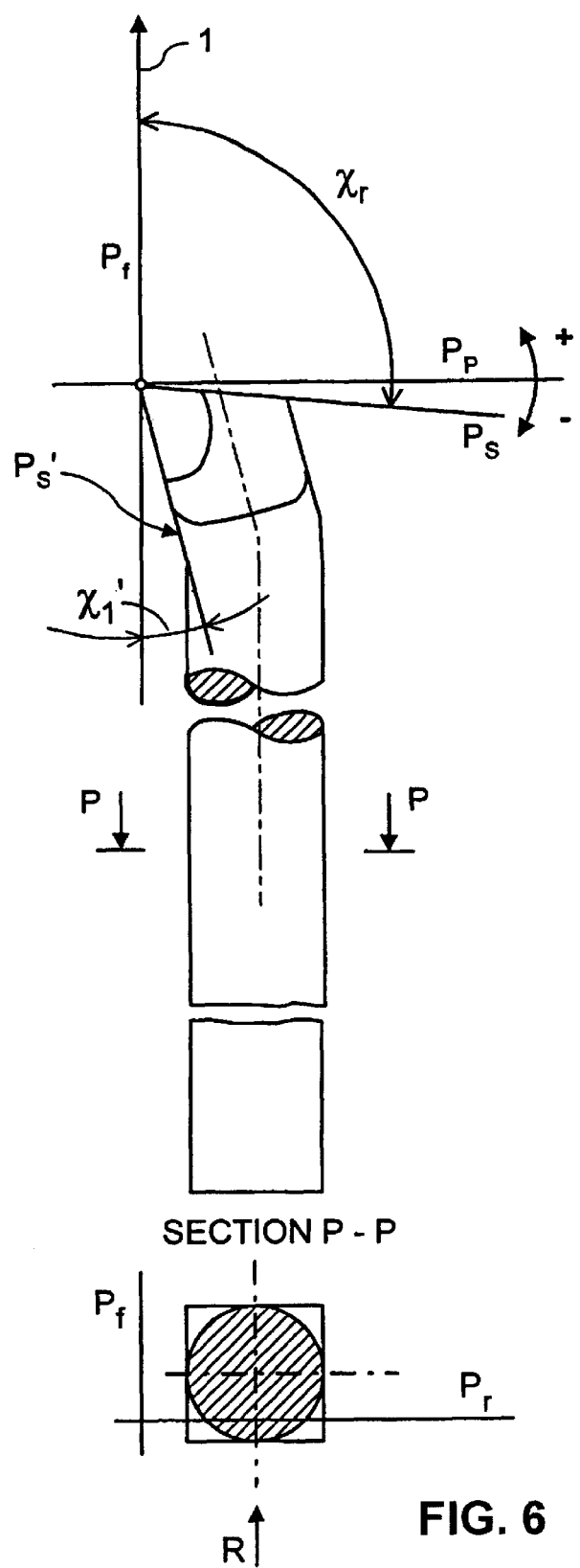
Figure 7A:
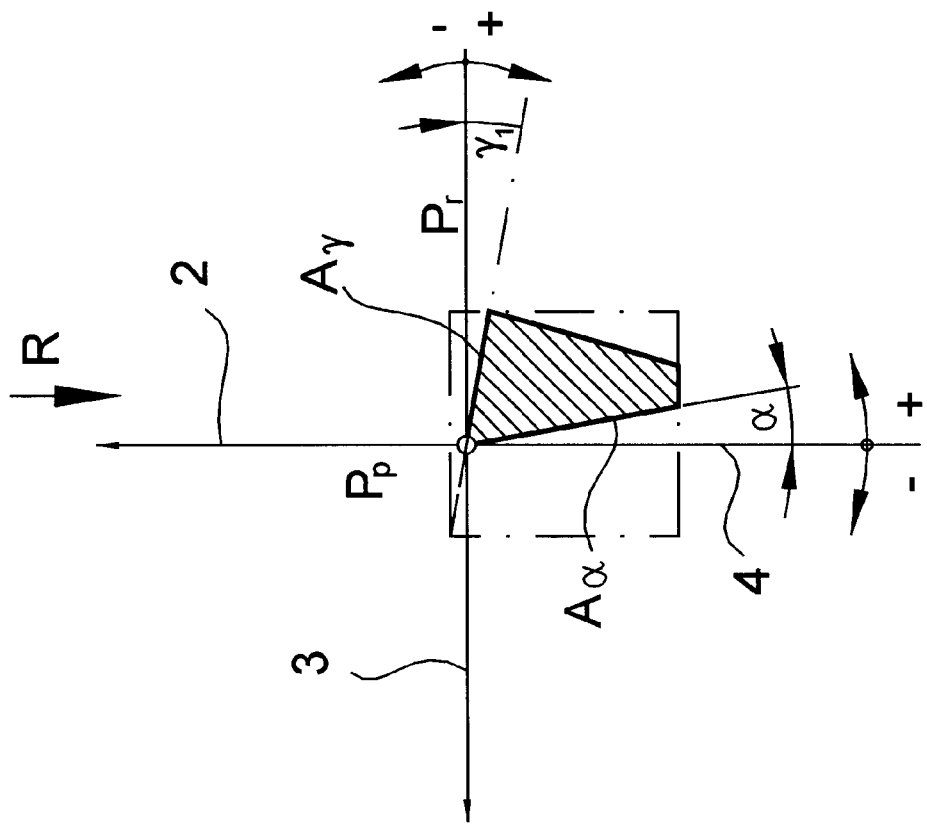
FIGS. 7a–7f show various sections through a turning tool in the planes stated in accordance with FIGS. 3 and 4.
Figure 7B:
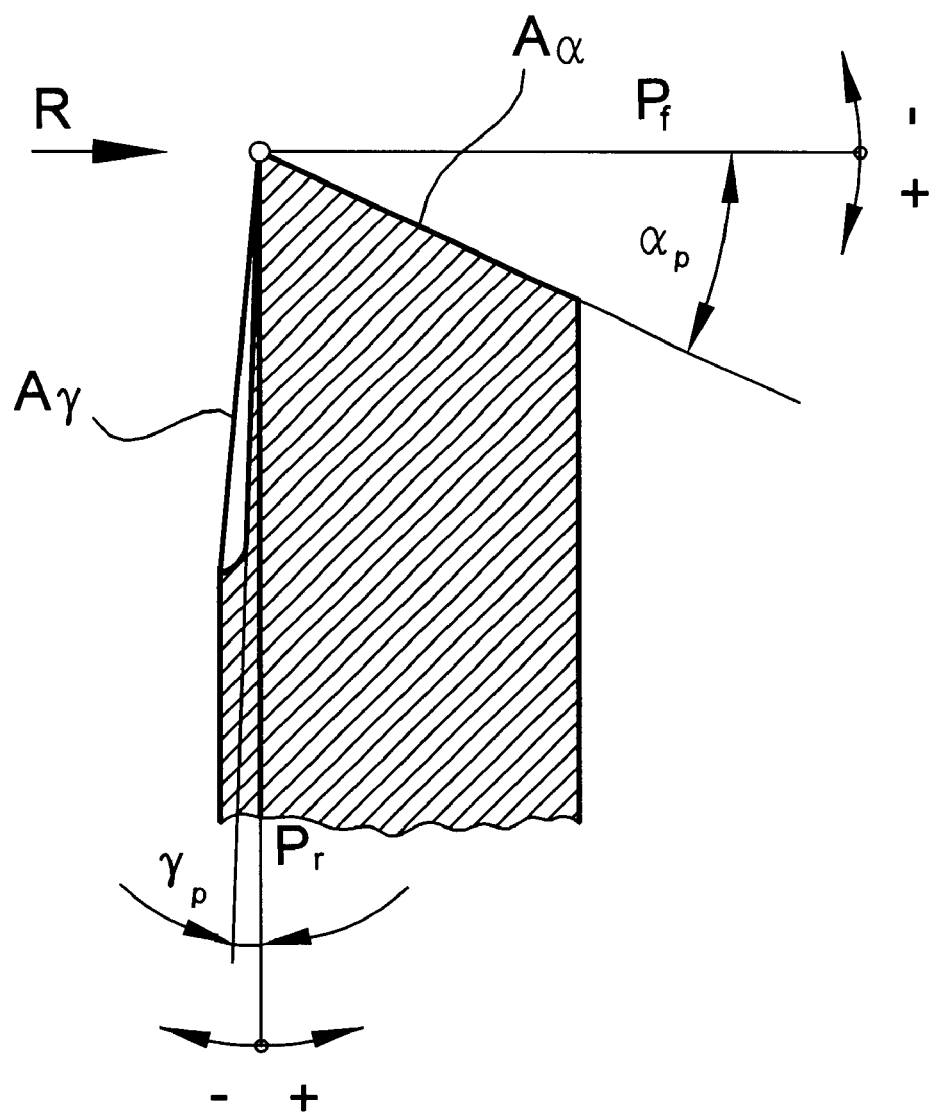
Figure 7C:
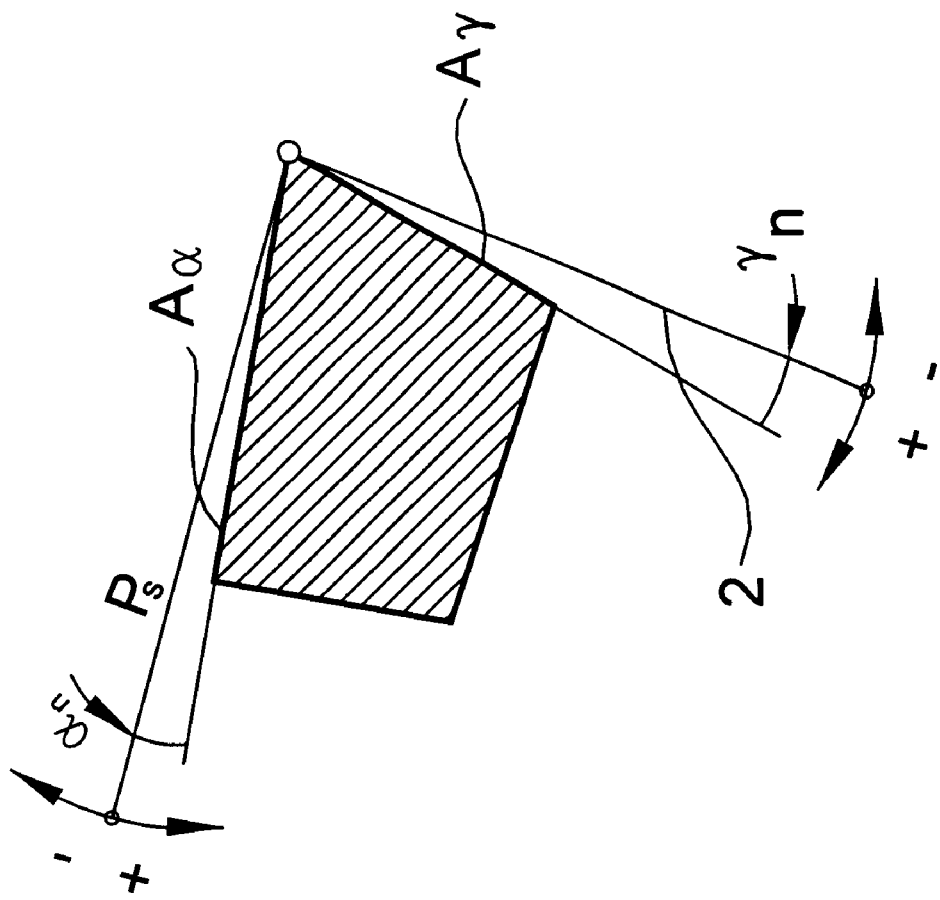
Figure 7D:
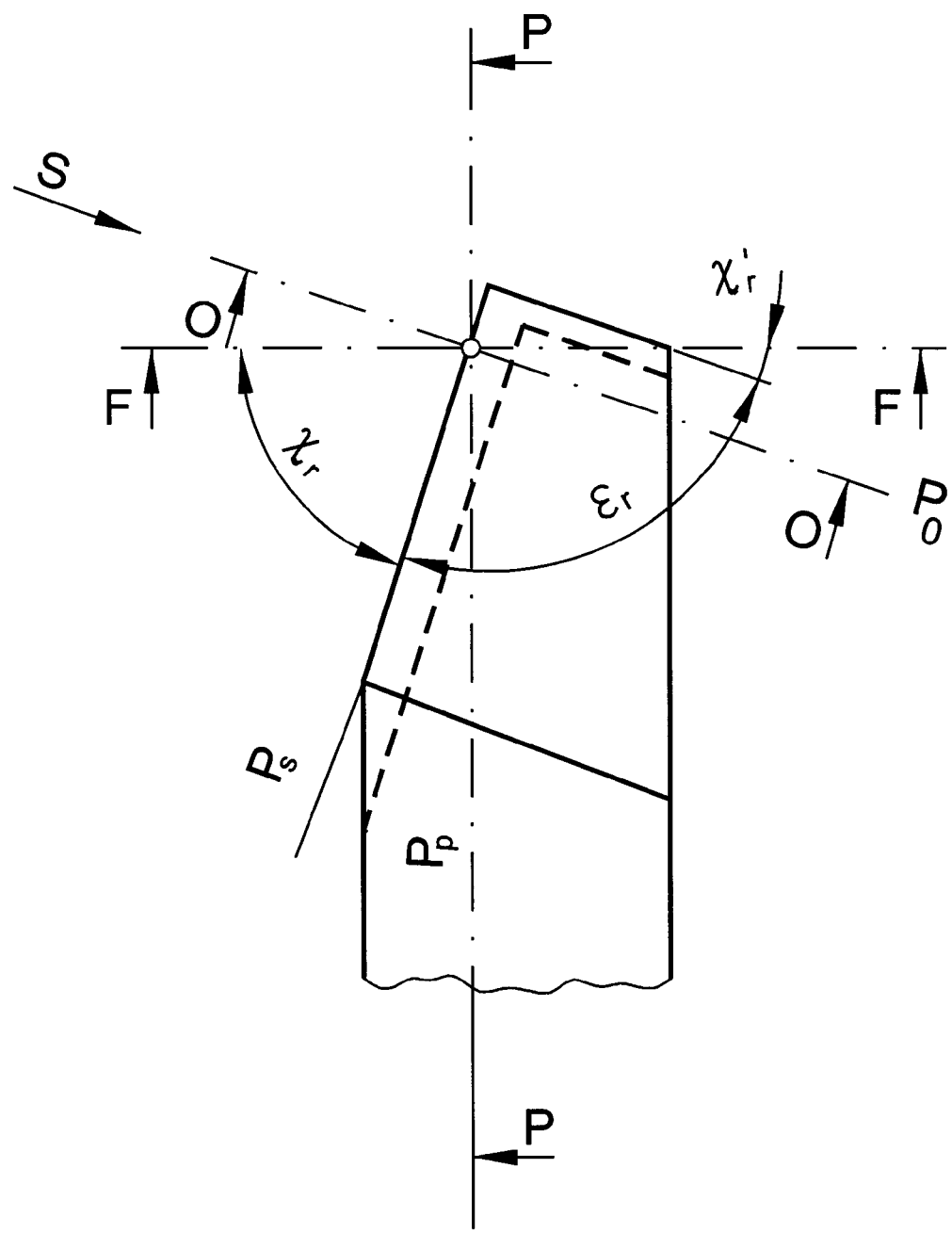
Figure 7E:
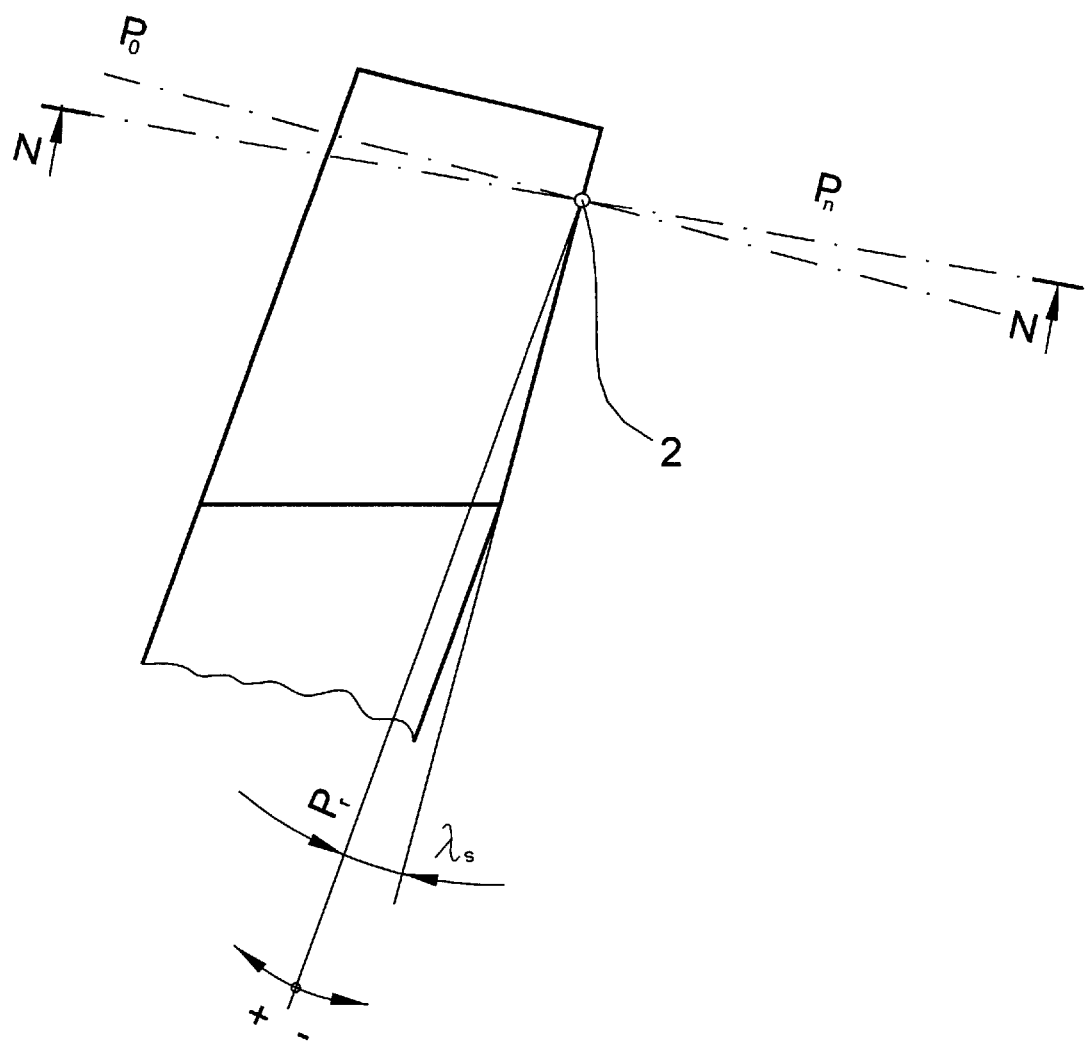
Figure 7F:
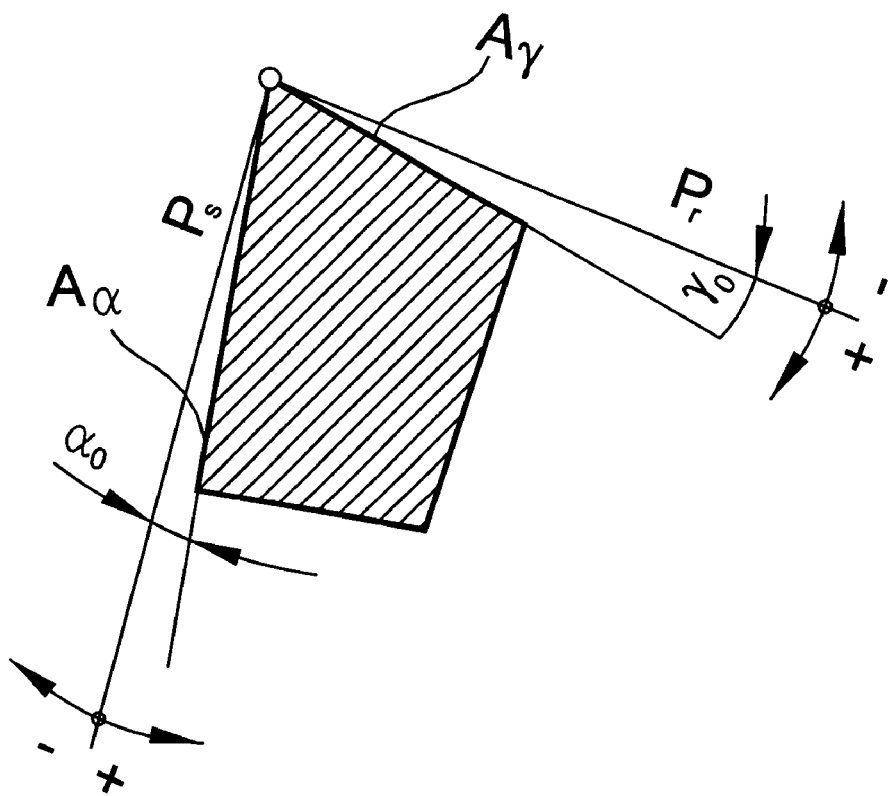
Figure 8:
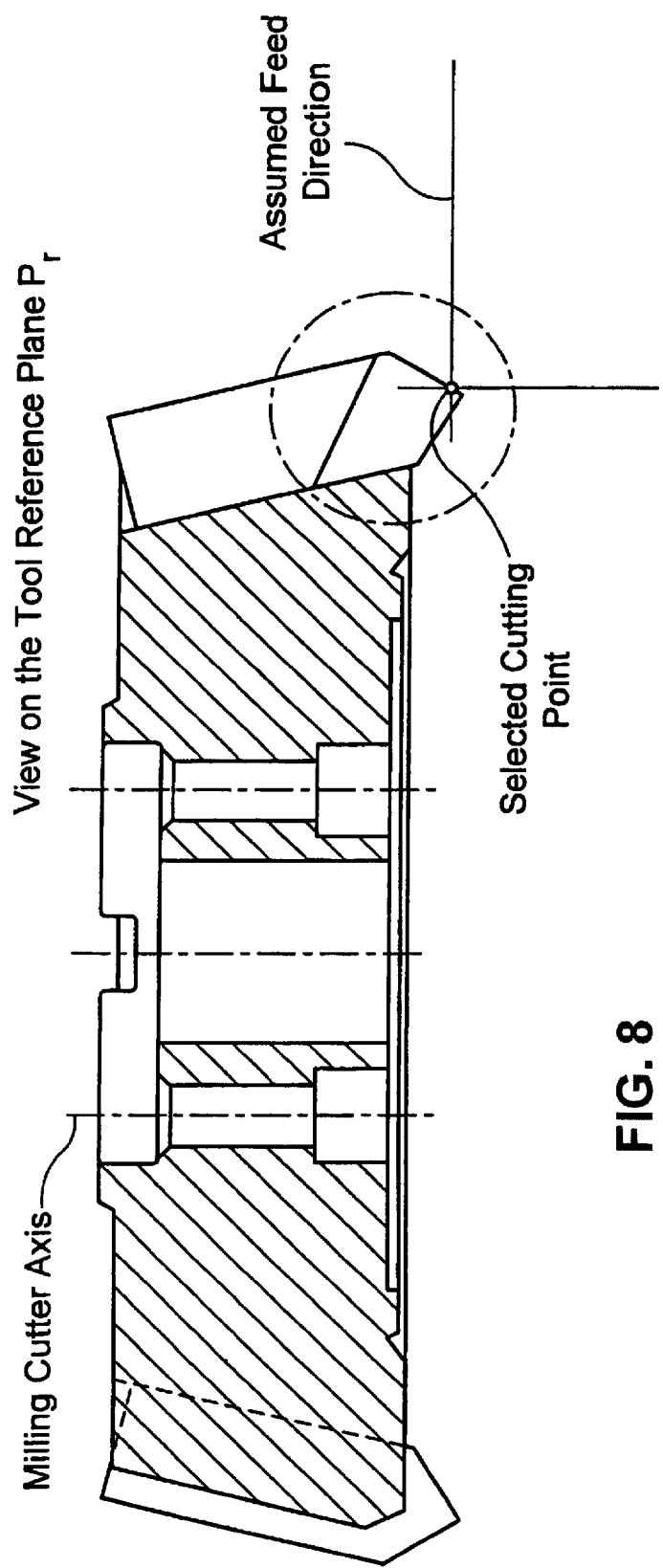
FIG. 8 shows a section through a milling cutter head.
Figure 9A:
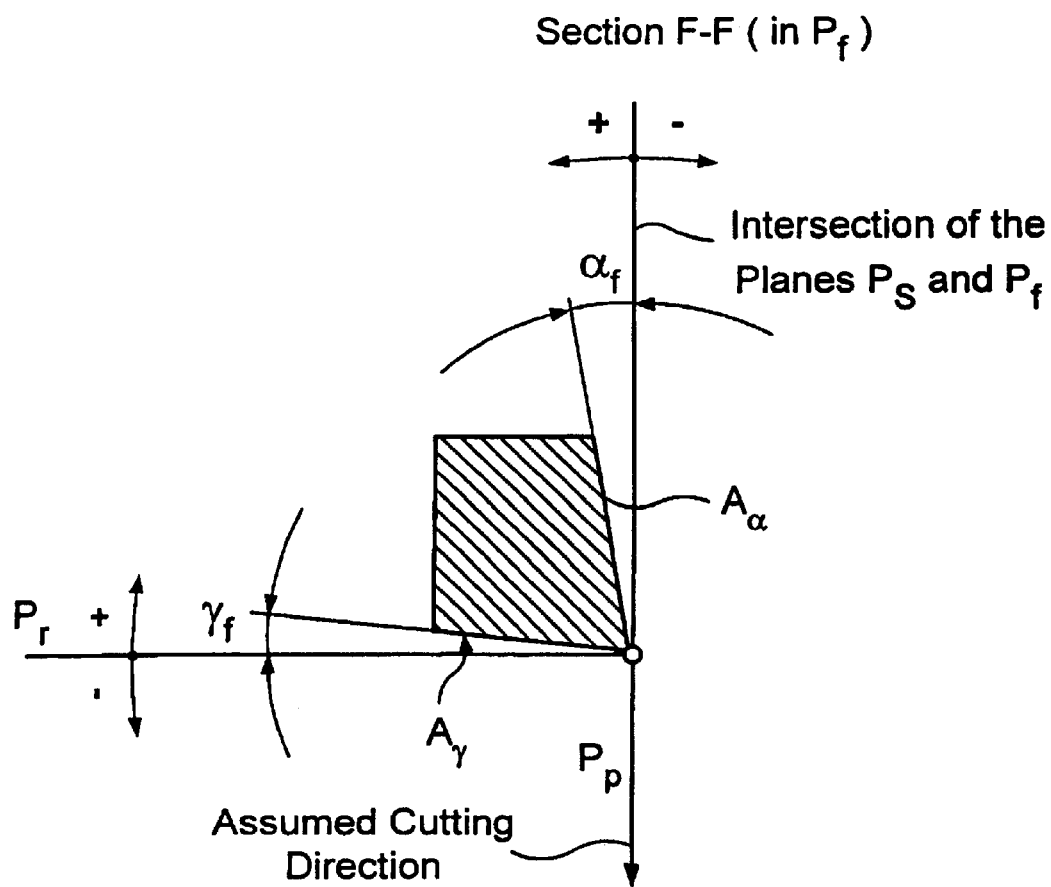
FIGS. 9a–9f show sections through the tool of the milling cutter head in accordance with FIG. 8.
Figure 9B:
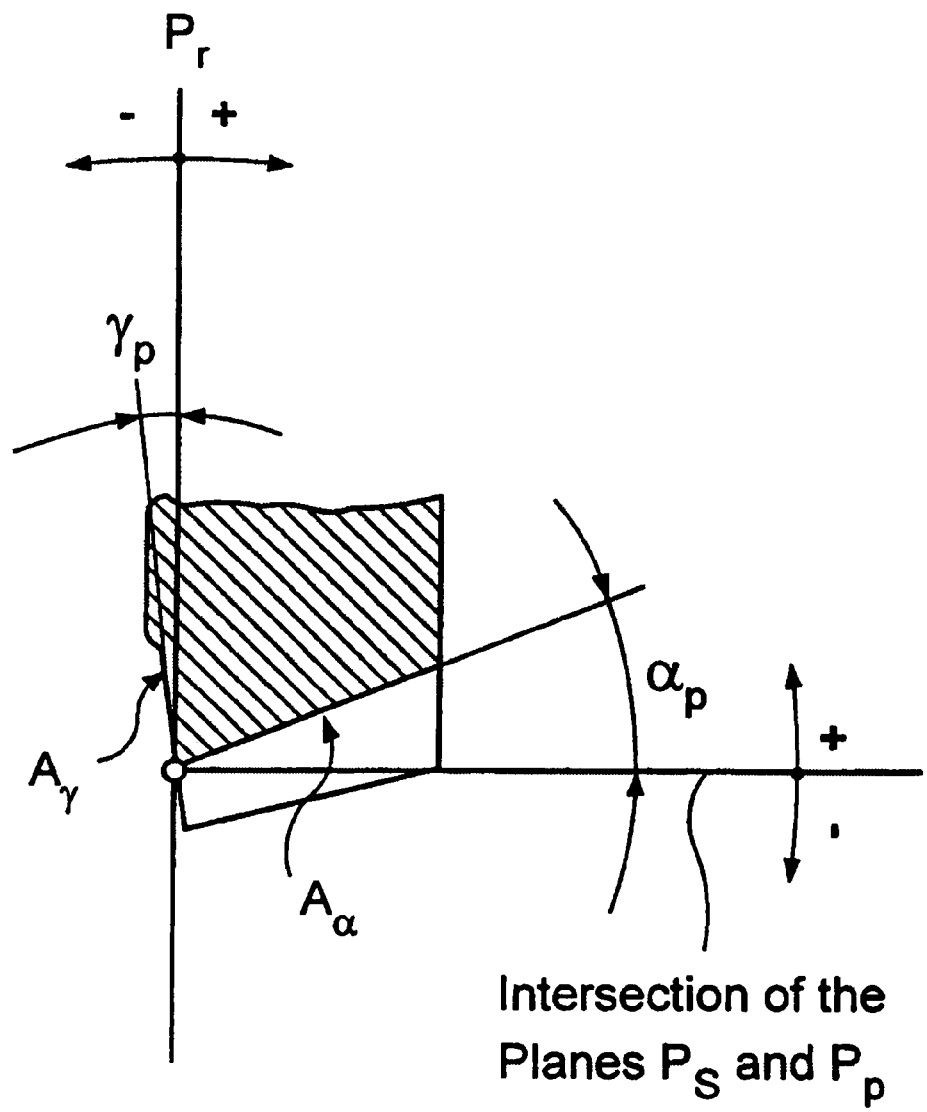
Figure 9C:
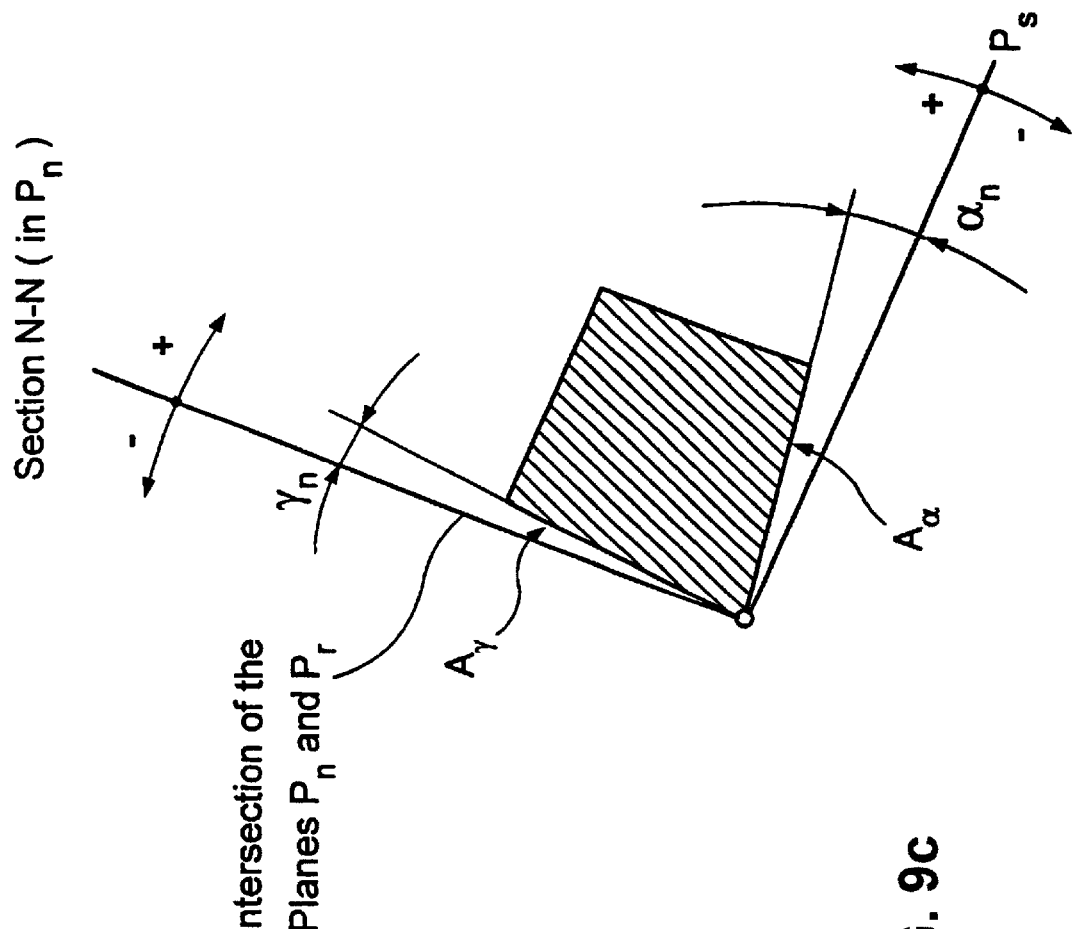
Figure 9D:
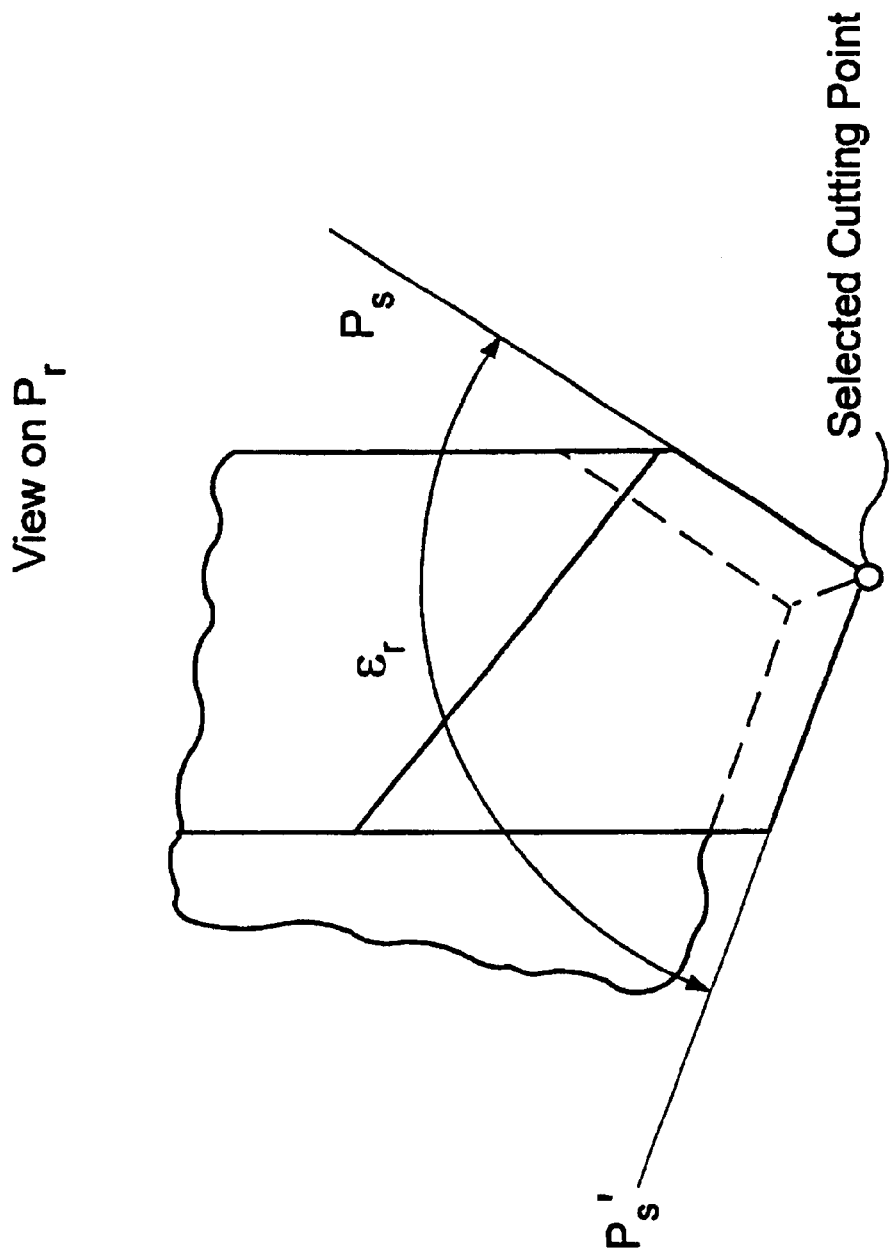
Figure 9E:
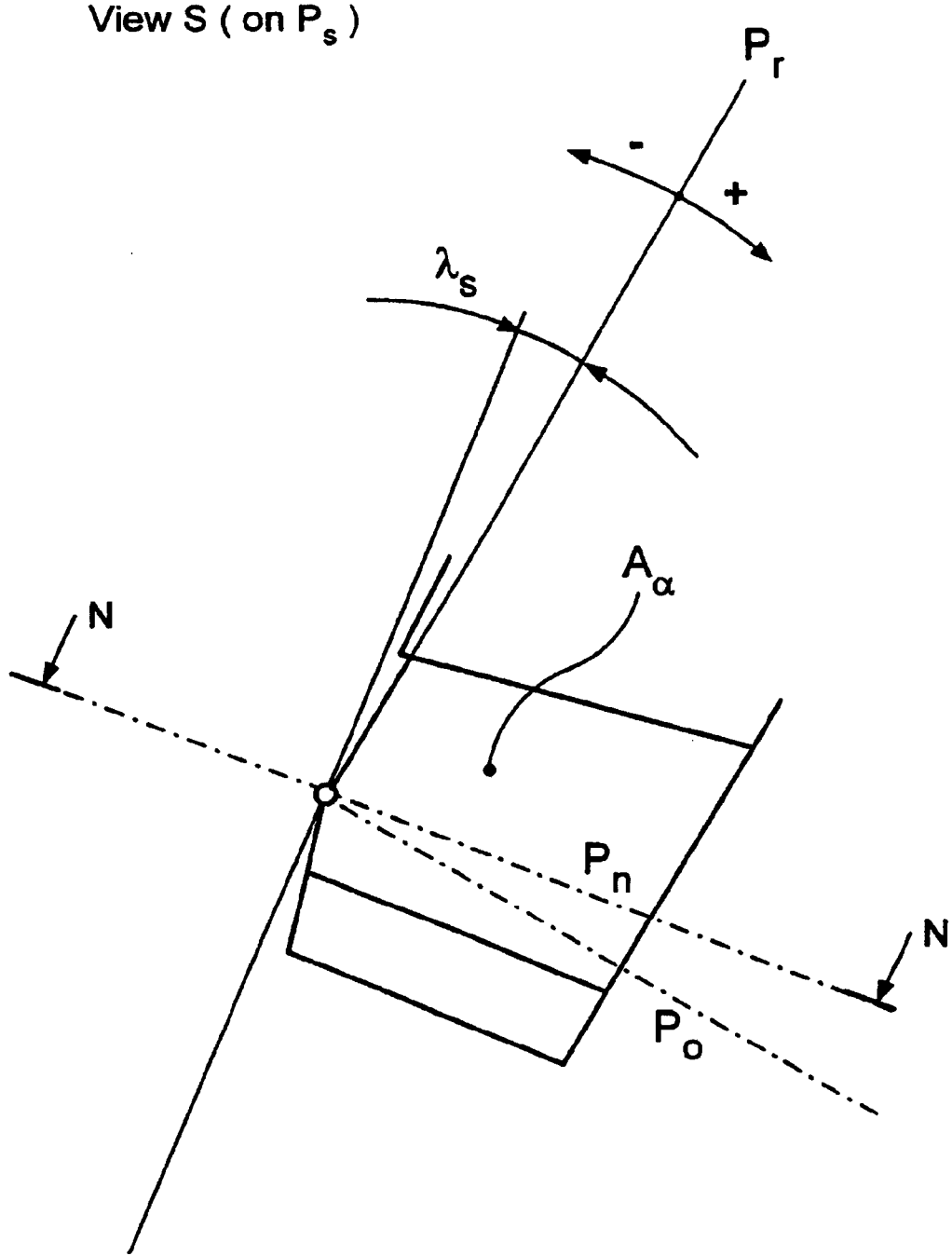
Figure 9F:
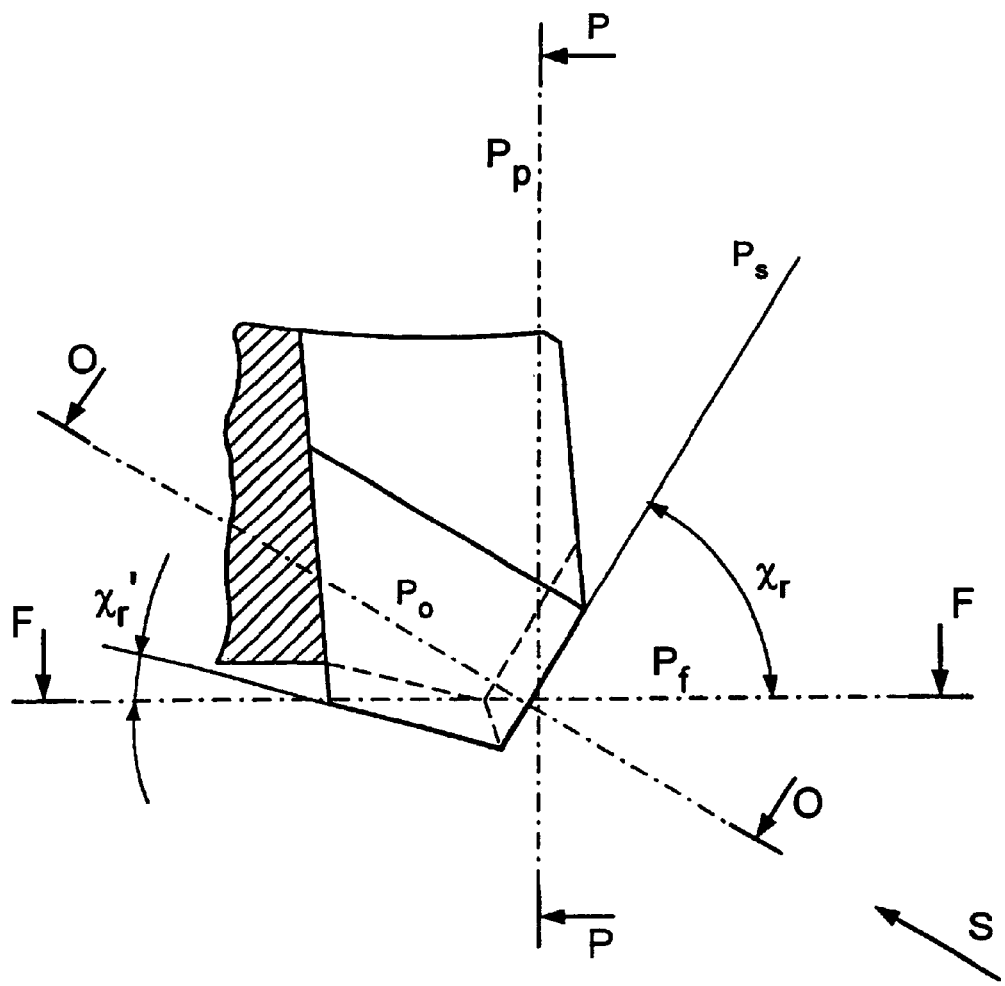

The orientation of the individual tool cutting edges with respect to the workpiece can be seen more clearly from FIGS. 5 and 6, separately for plain turning and face turning. Considered in this plan view, the tool has at its cutting-edge point a tool nose angle $\epsilon_r$ between the tool cutting-edge plane $P_s$ of the main cutting edge and the tool cutting-edge plane $P'_s$ of the secondary cutting edge, measured in the tool reference plane $P_r$.

In this case, the main cutting edge is at a tool adjustment angle $\kappa_r$ between the tool cutting plane $P_s$ and the assumed working plane $P_f$, measured in the tool reference plane $P_r$.

FIGS. 7a–7f and 9a–9f directly show the position of the individual sections and views, some of which are from FIGS. 5 and 6.

The relevant angles here are:

Tool side rake $\gamma_f$: angle between the tool face $A_\gamma$ and the tool reference surface $P_r$, measured in the working plane $P_f$;

Tool rear rake $\gamma_p$: angle between the tool face $A_\gamma$ and the tool reference plane $P_r$, measured in the tool rear plane $P_p$;

Tool normal cutting rake $\gamma_n$: angle between the tool face $A_\gamma$ and the tool reference plane $P_r$, measured in the tool cutting-edge normal plane $P_n$; the value of this angle $\gamma_n$ (positive or negative) is usually referred to in a generalized way as "positive/negative tool geometry".

Tool cutting-edge angle of inclination $\lambda_s$ (FIGS. 7e and 9e): angle between the cutting edge S and the tool reference point $P_r$, measured in the tool cutting-edge plane $P_s$.

This tool cutting-edge angle of inclination $\lambda_s$ is an acute angle, the point of which faces towards the tool nose. It is positive when the cutting edge, to be viewed starting from the tool nose, lies on that side of the tool reference plane $P_r$ which faces away from the assumed cutting direction.

$\alpha$ generally denotes the clearance angle of a cutting edge.

FIG. 10 shows a web-cutting tip, which is screwed on the end side, preferably on both sides, onto the disc-like base body of the milling cutter and thus protrudes beyond the base body both radially and on the end side. In order to abrade the material from the end face of the web, with the milling cutter parallel to the workpiece, rotating the latter is moved forwards in the X-direction, that is to say radially with respect to the workpiece, as the feed direction. Here, the plane of the bit-like web-cutting tip, i.e. the tool cutting-edge plane $P_s$, is positioned at a small angle k to the working plane $P_f$, which is composed of the feed direction (X-direction) and the cutting direction, which lies in the X-Y plane. As a result, the outer edge, which is rounded with the nose radius R of about 1.6 mm, of the cutting bit projects obliquely outwards from the base body and forms the point which protrudes furthest axially with respect to the base body of the milling cutter.

The larger the angle κ, the more wavy the machined end face of the web becomes, as can be seen from the already machined part in FIG. 10.

Figure 10A:
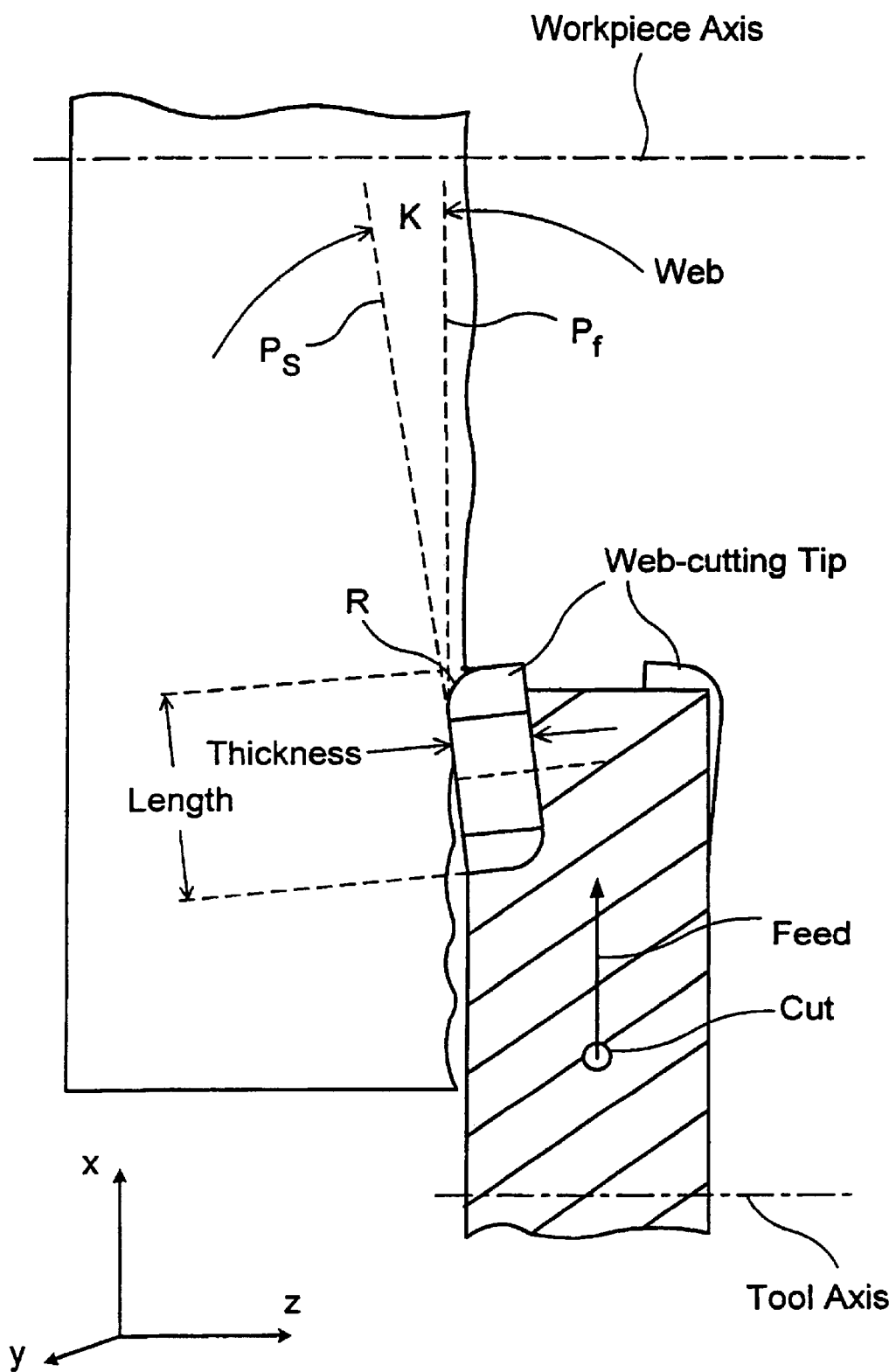
FIG. 10a shows the insert of a web-cutting tip, viewed in the Y-direction.

In order to be able to machine the entire end face of a web, an additional rotation of the crankshaft may additionally (see FIG. 12) be necessary as well as the feed, depicted in FIG. 10a, in the X-direction of the milling cutter, if, for example, it is intended to machine the web surface as far as the crankpin journal $H_2$ and around the latter.

Figure 12:
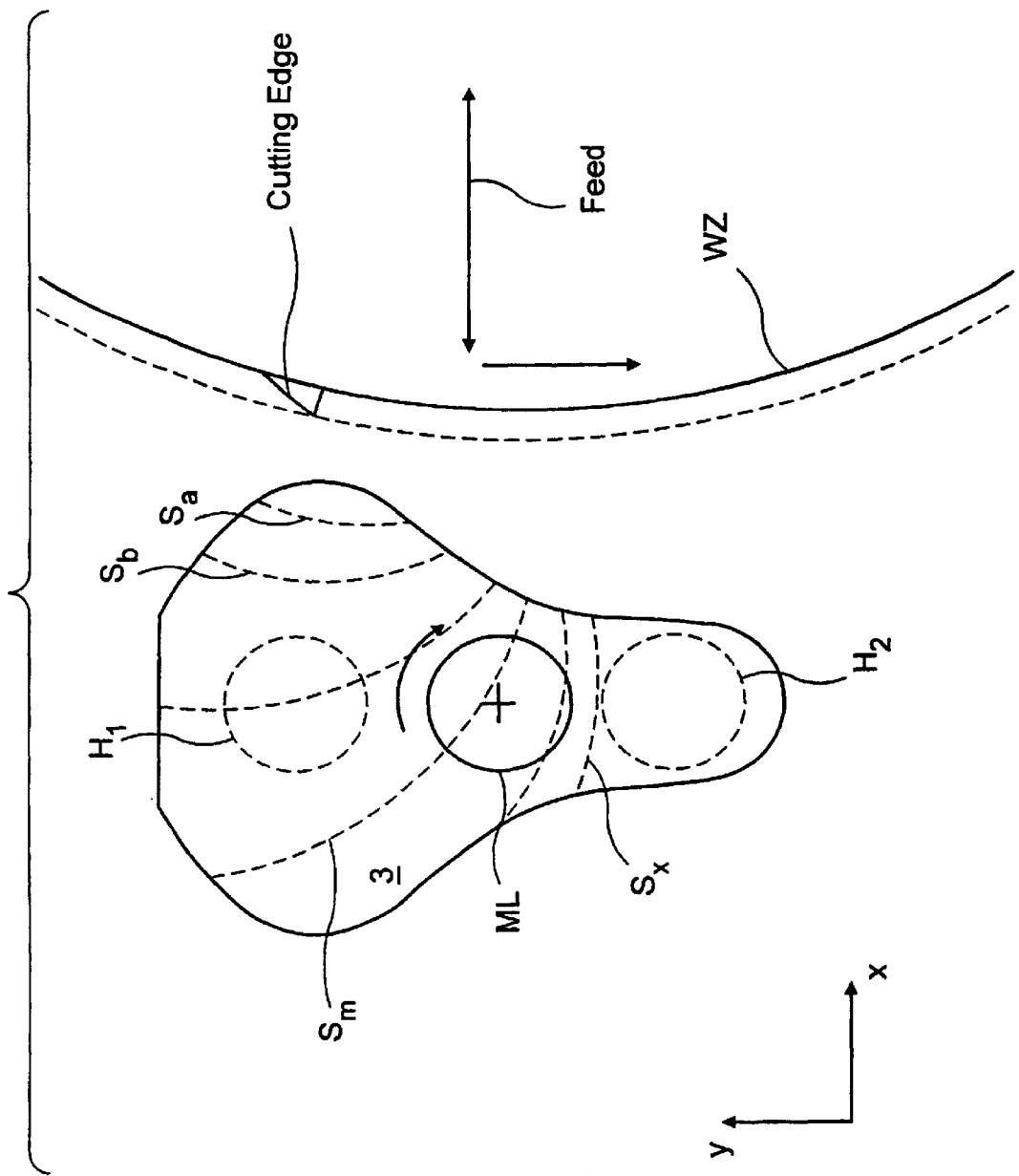
FIG. 12 shows the web machining, viewed in the Z-direction.

FIG. 12 shows some of the multiplicity of individual cuts $S_a$ to $S_x$ which are necessary for completely machining the web. It can be seen here that, firstly, within each of the cuts the ratio between the largest chip thickness, lying in the starting region of the cut, and the smallest chip thickness, which usually occurs at the end, [lacuna] of different size. In addition, the chip thickness is affected both by the feed of the milling cutter in the X-direction and by the speed of rotation of the workpiece.

In order to achieve an average chip thickness $h_{mitt}$ which is as uniform as possible and, as a second optimization target, to achieve the desired optimally high cutting speed, which is primarily effected by the rotation of the milling cutter, it is usually necessary during machining of the web side face for both the rotational speed of the workpiece and also the feed of the milling cutter in the X direction, and also the rotational speed of the milling cutter, to be constantly adjusted.

In the case of a web-cutting tip as shown in FIG. 10a, the extent of the tip in the radial direction of the body of the milling cutter is referred to as the length of the cutting tip, the extent in the tangential direction of the disc-like body of the tool is referred to as the width, and the extent in the direction of the cutting bit closest to the axial direction is referred to as the thickness.

Figure 10B:
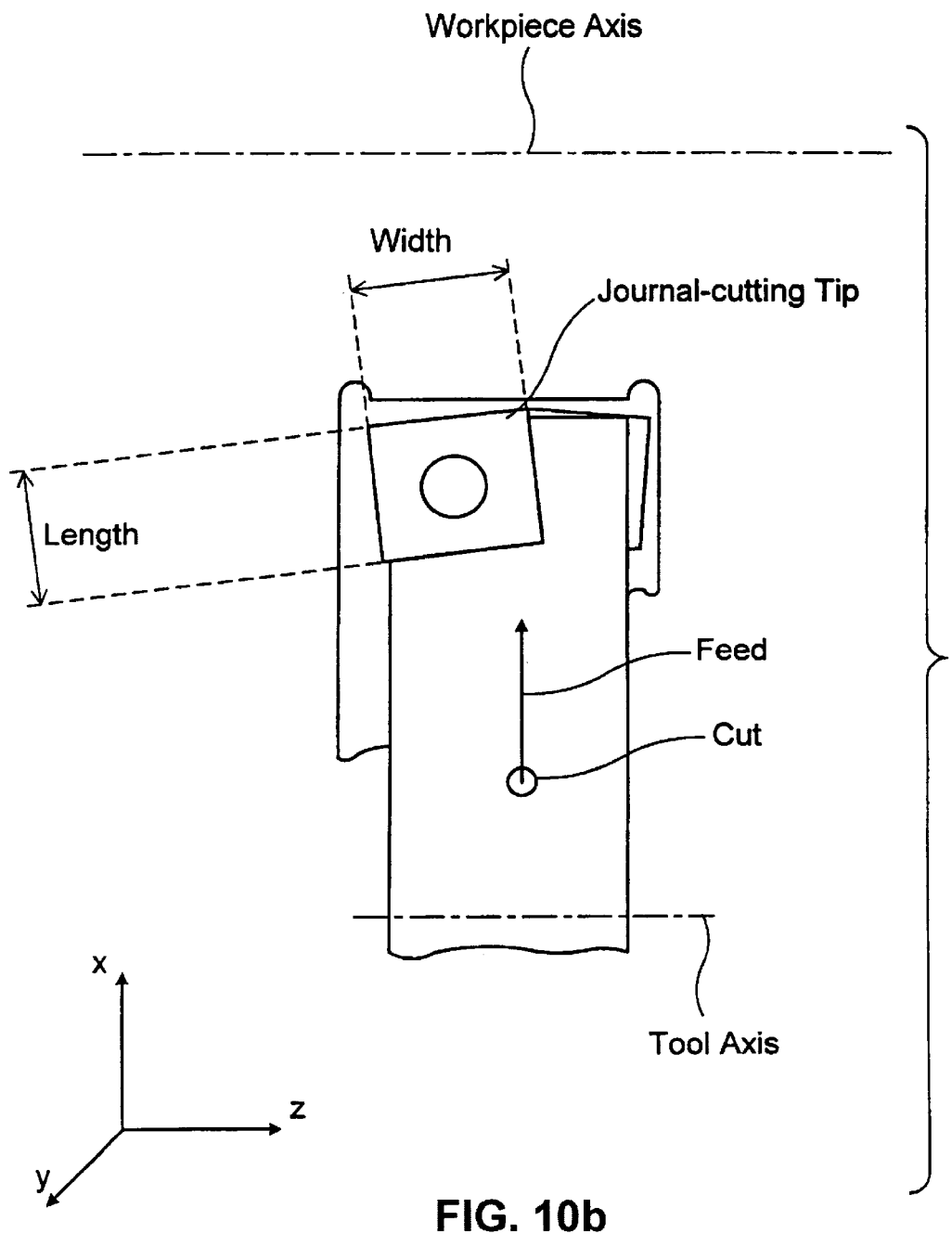
FIG. 10b shows the insert of a journal-cutting tip in the Y-direction of viewing.

FIG. 10b shows, in the same direction of viewing as FIG. 10a, the machining of the peripheral surface of a journal of the crankshaft by means of a journal-cutting tip. For a tip of this kind, length and width are intended to mean the sides which can be seen in the plan view of FIG. 10b, the square throw-away cutting-tool tips usually being used as journal-cutting tips; these throw-away cutting-tool tips can thus be used four times in succession.

The journal-cutting tips can then be fastened with their external cutting edge at a small angle deviating from the Z-direction within the Z-X plane on the body of the disc milling cutter if, at the same time, a deviation from the Z-direction is also provided within the Z-Y plane.

Figure 11:
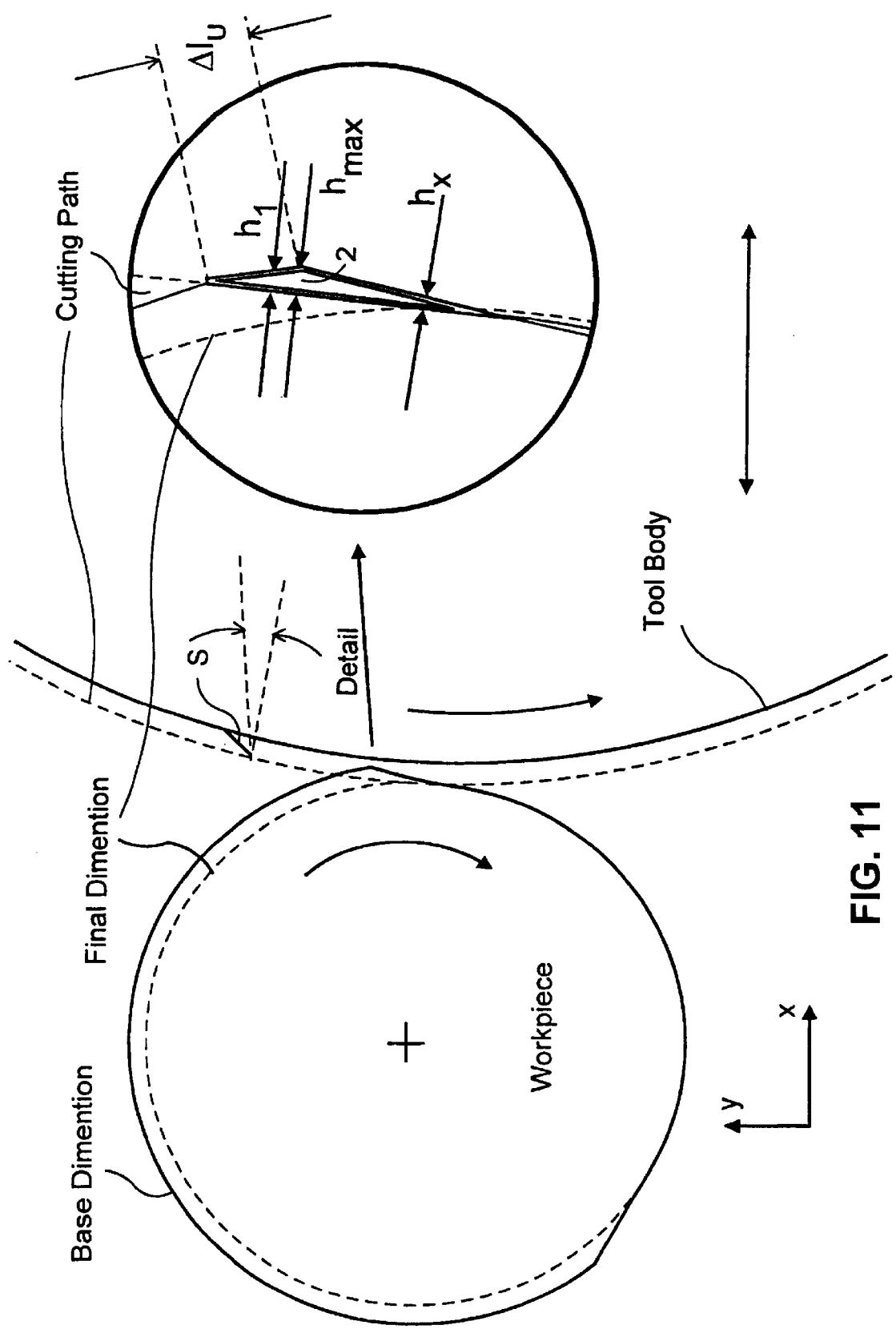
FIG. 11 shows the journal machining, viewed in the Z-direction.

As shown by the view of the machining of the journals, viewed in the Z-direction of FIG. 11, the climb-cutting process (direction of movement of the milling cutter edge= direction of movement of the workpiece surface) relative to the machining point is used primarily in the machining of journals, but also in the machining of webs. This results in a chip whose chip thickness is relatively great at the start ($H_1$) and decreases ($h_x$) to an increasing extent towards the end of the chip.

Climb cutting is to be preferred due to the fact that the cutting edge bites correctly when engaging into the workpiece, that is to say that the workpiece is scarcely pushed away at all in the X-direction owing to the initially large chip thickness. If conventional milling, in which the chip has a chip thickness which essentially increases during the production, is used, this effect in fact occurs to an increasing extent, resulting in a more pronounced roundness deviation.

In the machining of journals, as illustrated in FIG. 11, the centre point of the milling cutter—after setting to nominal size—remains stationary during abrasion of the circumference of the journal, if the journal involved is for a centre bearing. In contrast, if a crankpin journal is being machined, the milling cutter has to constantly follow the rotation of the crankpin journal at about 15 revolutions/minute about the main bearing axis, and, since the crankpin journal is moving not only in the X-direction but also in the Y-direction, at differing speeds, since the milling cutter is moved exclusively in the X-direction.

If the dimension over the circumference of the bearing journal remains constant, the desired average chip thickness $h_{mitt}$ therefore depends exclusively on the rotational speed of the bearing journal about its centre axis, that is to say, in the case of a crankpin journal, on the rotation of the machined point on the peripheral surface about the centre of the big-end journal.

Since, however, the crankshaft is chucked on the main bearing axis, that is to say its axis of symmetry, when machining crankpin journals, even when the dimension over the big-end journal circumference remains constant, the rotational speed of the workpiece has to be adjusted continually during the rotation.

Figure 13:
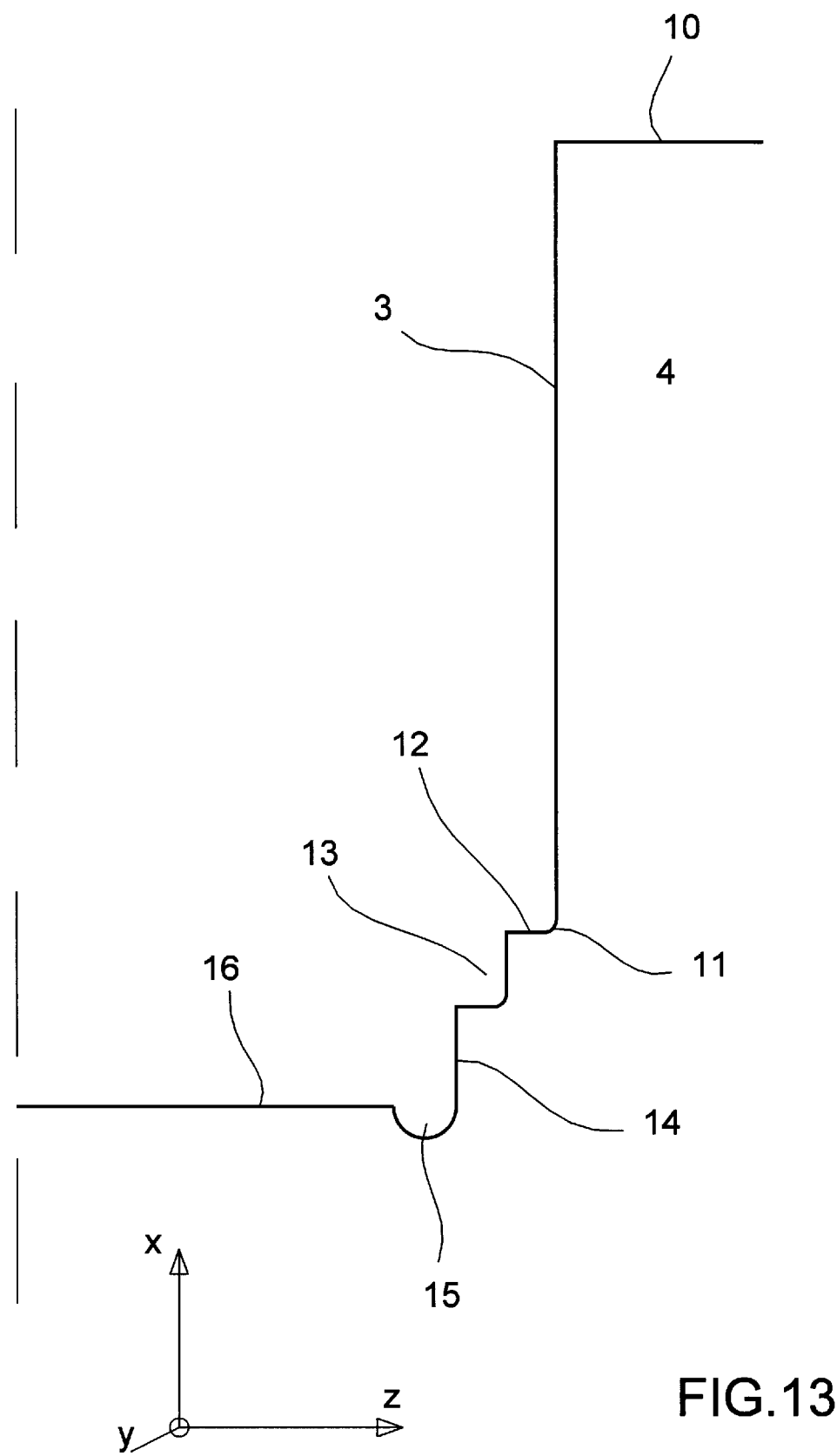
FIG. 13 shows an overview of the surfaces to be machined on a crankshaft.

FIG. 13 shows those surfaces which are waiting for machining on a crankshaft.

The first of these is the outer contour 10 of the web. This may be an outer contour which is bent in the form of a circle, a convex outer contour which is bent irregularly, or else an outer contour which is partially provided with a planar outer surface. External milling allows various contours to be produced, including planar surfaces which run tangentially with respect to the axis of rotation of the crankshaft, or else at an angle thereto, and even indentations, as long as the radius of curvature thereof is greater than the radius of curvature of the external milling cutter.

The outer contour 10 of the web is adjoined by the side face 3 of the web, which side face reaches radially inwards as far as close to the peripheral surface 16 of the journal, that is to say of a big-end journal H or of a centre bearing ML. The radial inner end of the side surface 3 of the web is adjoined by the mostly rounded web transition 11, which merges into a short peripheral surface 12, which is part of the web transition 11.

The axially outer end of the peripheral surface 16 of the journal is adjoined by an undercut 15, which at its end remote from the peripheral surface 16 merges [lacuna] an end-side oil collar 14, which determines the bearing width.

An additional step 13 may be arranged between the end-side oil collar 14 and the web transition 2 [sic].

In the case of these machined surfaces, the peripheral surface 16 of the journal is generally milled using journal-cutting tips, mostly as is the circumferential contour 10 of the web 4. The undercut 15 is—mostly together with the adjoining oil collar 14—mostly produced in one operation by a separate undercut-cutting tip.

The end-side web surface 3 is as a rule produced using a separate web-cutting tip, in which process the web transition 11 with the peripheral surface 12 is also produced.

A separate web-cutting tip is used for machining the web side face 3, since for this operation it is necessary to remove large amounts of chips and therefore if the web side face were to be produced, for example, using a journal-cutting tip, the latter would be subject to rapid wear.

It is then possible to arrange either only web-cutting tips or web-cutting tips together with undercut-cutting tips on the base body of a milling cutter, as a result of which it is possible, for example, to machine the peripheral surface 16 together with the undercut 15 and the oil collar 14.

The undercut-cutting tips may also be arranged on a separate milling cutter.

The web-cutting tips too are generally arranged on separate milling cutters, mostly on both sides of the bodies thereof in the case of two-sided deployment. However, it is also possible to arrange these web-cutting tips in the edge region of a milling-cutter body, together with journal-cutting tips for machining peripheral surfaces.

In order to be able to produce greater axial lengths of the peripheral surface 16, etc., the tool can be moved in the Z-direction during the production and can thus mill a helical path on the peripheral surface.

Key to Figures

FIG. 1

1. Cutting direction
2. Tool face $A_\gamma$
3. Wedge
4. Main flank $A_\alpha$
5. Plane of figure=working plane
6. Feed direction
7. Cutting edge S

FIG. 2

1. Shank
2. Tool face $A_\gamma$
3. Tool nose
4. Secondary cutting edge S'
5. Secondary flank $A_\alpha$
6. Feed direction
7. Main flank $A_\alpha$
8. Main cutting edge S

FIG. 3

1. Assumed cutting direction
2. Assumed feed direction
3. Bearing plane
4. Selected cutting point

FIG. 4

1. Assumed cutting direction
2. Assumed feed direction
3. Bearing plane
4. Selected cutting point

FIG. 5

1. View R (on $P_r$)
2. Assumed feed direction
3. Selected cutting point
4. Section F—F

FIG. 6

1. Assumed feed direction
2. View R (on $P_r$)
3. Section P—P

FIG. 7a

1. Section F—F (in $P_f$)
2. Assumed cutting direction
3. Assumed feed direction
4. Intersection of the planes $P_s$ and $P_f$

FIG. 7b

1. Section P—P (in $P_p$)

FIG. 7c

1. Section N—N (in $P_n$)
2. Intersection of the planes $P_n$ and $P_r$

FIG. 7d

1. View R (on $P_r$)

FIG. 7e

1. View S (on $P_s$)
2. Selected cutting-edge point

FIG. 7f

1. Section O—O (in $P_o$)

FIG. 8

1. Milling cutter axis
2. View on the tool reference plane $P_r$
3. Assumed feed direction
4. Selected cutting-edge point

FIG. 9a

1. Section F—F (in $P_f$)
2. Intersection of the planes $P_s$ and $P_f$
3. Assumed cutting direction

FIG. 9b

1. Section P—P (in $P_p$)
2. Intersection of the planes $P_s$ and $P_p$

FIG. 9c

1. Section N—N (in $P_n$)
2. Intersection of the planes $P_n$ and $P_r$

FIG. 9d

1. View on the tool reference plane $P_r$ with the selected cutting-edge point at the tool nose
2. Selected cutting-edge point

FIG. 9e

1. View S (on $P_s$)

FIG. 10a

1. Workpiece axis
2. Web
3. Web-cutting tip
4. Thickness

5. Length
6. Feed
7. Cut
8. Tool axis

FIG. 10b

1. Workpiece axis
2. Width
3. Journal-cutting tip
4. Length
5. Feed
6. Cut
7. Tool axis

FIG. 11

1. Journal
2. Final dimension
3. Cutting path
4. Cutting edge
5. Detail
6. Workpiece
7. Tool body
8. Feed

FIG. 12

1. Feed
2. Tool body

What is claimed is:

1. Process for the metal-removing machining of a crankshaft, comprising the steps of
providing a disc-shaped external milling cutter having cutting edges positioned on the outer circumference thereof and having a diameter larger than the necessary penetration depth for the crankshaft to be produced at the big-end journal remote from the cutter,
rotating the crankshaft, and
machining peripheral surfaces of the crankshaft only with said cutting edges positioned on the outer circumference of said milling cutter, by rotating the milling cutter parallel to the crankshaft to have a cutting speed of at least 180 m/min when roughing and at least 200 m/min when finishing, and a chip thickness of between 0.05–0.5 mm, and machining the journals by a climb-cutting process relative to the machining point.

2. Process according to claim 1, wherein the cutting edges (S) of the external milling cutter (5) have a positive tool normal cutting rake.

3. Process according to claim 1, wherein the rotational speed of the crankshaft is up to and including 60 revolutions/minute.

4. Process according to claim 1, wherein the crankshafts have big-end journals (H1, H2 . . . , and webs (4) with web side faces (3) and center bearings (ML).

5. Process according to claim 4, wherein the web surfaces (3) of the crankshaft (1) are also machined.

6. Process according to claim 5, wherein the web surfaces (3) and adjoining peripheral surfaces of the center bearing (ML) or the big-end journal are machined simultaneously.

7. Process according to claim 6, wherein during the machining of the big-end journals (H1, H2) the crankshaft (1) rotates about the axis of symmetry of the center bearings (ML) and the external milling cutter (6) is made to follow the rotation of the big-end journal so that the external milling cutter moves relatively along an axis running between a first rotation axis of said center bearings and a second rotation axis of said external milling cutter in such a manner that the cutting edges of the rotational external milling cutter (5) machine the peripheral surface of the big-end journal, and wherein the diameter of the milling cutter is larger than a necessary penetration depth for the crankshaft to be produced at the big-end journal remote from the milling cutter.

8. Process according to claim 7, wherein during the machining of the big-end journals the crankshaft (1) rotates about the axis of symmetry of the center bearings (ML) and the external milling cutter (5) is additionally made to follow the rotation of the big-end journal so that the external milling cutter moves relatively along the second rotation axis in such a manner that the cutting edges of the rotating external milling cutter (5) machine the peripheral surface of the big-end journal.

9. Process according to claim 1, wherein the rotational speed of the milling cutter is a multiple of the rotational speed of the crankshaft.

10. Process according to claim 9, wherein the rotational speed of the milling cutter is at least five times the rotational speed of the crankshaft.

11. Process according to claim 2, wherein the cutting edges have a positive tool normal cutting rake($\gamma_n$).

12. Process according to claim 3, wherein the rotational speed of the crankshaft is 10–20 revolutions per minute.

13. Process according to claim 1, wherein the cutting speed is at least 300 m/min when roughing, and at least 500 m/min when finishing.

14. Process according to claim 1, wherein the chip thickness is between 0.1 and 0.3 mm.

* * * * *